US009372666B2

(12) United States Patent
 Noda

(10) Patent No.: US 9,372,666 B2
(45) Date of Patent: Jun. 21, 2016

(54) RANDOM NUMBER GENERATING DEVICE

(71) Applicant: MAKITA CORPORATION, Anjo-shi, Aichi (JP)

(72) Inventor: Masafumi Noda, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 240 days.

(21) Appl. No.: 14/099,464

(22) Filed: Dec. 6, 2013

(65) Prior Publication Data

US 2014/0181167 A1  Jun. 26, 2014

(30) Foreign Application Priority Data

Dec. 21, 2012 (JP) .................................. 2012-279601

(51) Int. Cl.
  *G06F 7/58* (2006.01)
  *H02J 7/00* (2006.01)

(52) U.S. Cl.
  CPC *G06F 7/58* (2013.01); *G06F 7/588* (2013.01); *H02J 7/0004* (2013.01); *H02J 2007/0001* (2013.01)

(58) Field of Classification Search
  None
  See application file for complete search history.

(56) References Cited

U.S. PATENT DOCUMENTS

| 6,968,460 | B1* | 11/2005 | Gulick | G06F 7/58 |
| | | | | 708/250 |
| 7,941,865 | B2 | 5/2011 | Seman, Jr. et al. | |
| 2004/0139132 | A1* | 7/2004 | Lutkenhaus | H04L 9/0852 |
| | | | | 708/250 |
| 2008/0294707 | A1 | 11/2008 | Suzuki et al. | |
| 2009/0106338 | A1* | 4/2009 | Dunbar | G06F 7/586 |
| | | | | 708/251 |
| 2012/0235628 | A1 | 9/2012 | Okabayashi et al. | |
| 2014/0181167 | A1* | 6/2014 | Noda | G06F 7/58 |
| | | | | 708/250 |

OTHER PUBLICATIONS

Feb. 2, 2016 Office Action issued in German Patent Application No. 102013021805.5.
Kugiumkis, D.; Boudourides, M.A.: Chaotic Analysis of Internet Ping Data Just a Random Number Generator? OEIS project conference, Bielefeld, Germany, 1998.

* cited by examiner

*Primary Examiner* — David H Malzahn
(74) *Attorney, Agent, or Firm* — Oliff PLC

(57) ABSTRACT

A random number generating device includes a processing request part, a receiving part, a counting part, and a random number generation part. The processing request part makes a request for a predetermined processing to a processing requested object. The receiving part receives a response from the processing requested object in response to the request. The counting part performs a counting operation to increase or decrease a count value with a predetermined cycle, the counting operation being started at least prior to receipt of the response. The random number generation part acquires at least one count value of the counting part at least one predetermined acquisition timing after the receipt of the response is started, and generates a random number by using the at least one count value that is acquired.

11 Claims, 14 Drawing Sheets

RANDOM NUMBER GENERATING DEVICE

CROSS-REFERENCE TO RELATED APPLICATIONS

This application claims the benefit of Japanese Patent Application No. 2012-279601 filed on Dec. 21, 2012 in the Japan Patent Office, the disclosure of which is incorporated herein by reference.

BACKGROUND

The present invention relates to a random number generating device that generates a random number.

If an improper, non-approved battery is attached to electrically-powered equipment (such as an electric power tool, an electrically-driven machine, etc.) that operates by receiving a power supply from a battery, the equipment may be broken. Also, if an improper, non-approved battery is attached to a battery charger that charges a battery, the battery may abnormally generate heat.

In this type of equipment or battery charger, it is known that when a battery is attached thereto, whether or not the attached battery is a proper battery is determined (authenticated) by using a random number (see, for example, U.S. Pat. No. 7,941,865).

In U.S. Pat. No. 7,941,865, it has been proposed to generate, as a random number, noise bits (lower bits) of an A/D converted value obtained by an A/D converter, so as to perform authentication of a battery by using the random number.

SUMMARY

The method of generating a random number described in U.S. Pat. No. 7,941,865 uses a property change caused by change in a power supply voltage in an A/D converter. Consequently, it has been a problem that it is difficult to generate a random number having high randomness by a microcomputer alone since the microcomputer operates by receiving a stable power supply from a stabilized power source.

In this regard, if the A/D converter is externally attached to the microcomputer and the power source of the A/D converter is made to be unstable, unlike the stabilized power source of the microcomputer, it is possible to generate a random number by a calculation process by the microcomputer.

However, in this configuration, a problem arises in which a configuration of a random number generator becomes complicated, resulting in cost increase.

In view of the above, it is one aspect of the present invention to provide a random number generating device capable of generating a random number having high randomness with a simple configuration.

A random number generating device according to one aspect of the present invention is provided with: a processing request part that makes a request for a predetermined processing to a processing requested object; a receiving part that receives a response from the processing requested object in response to the request; a counting part that performs a counting operation to increase or decrease a count value with a predetermined cycle, the counting operation being started at least prior to receipt of the response; and a random number generation part that acquires at least one count value of the counting part at least one predetermined acquisition timing after the receipt of the response is started, and that generates a random number by using the at least one count value that is acquired.

In the above-constituted random number generating device, in a period from when the counting operation by the counting part is started to when the receiving part receives the response from the processing requested object in response to the request for processing from the processing request part, time uncertainty (random-number element) occurs. That is, even if the time period of receiving the response from the processing requested object in response to the request for processing from the processing request part is predefined in theory and design, in practice, such a time period may deviate from the predefined time. This deviation may be caused by, for example, a condition of transmission path for information, between the processing request part and the processing requested object, variation in a processing time in the processing requested object, etc. This deviation becomes a random-number element, and appears as a variation in the count value in the counting part (i.e., a variation having high randomness). Accordingly, the count value can be used as a random number.

Thus, the random number generating device in one aspect of the present invention can generate a random number having high randomness with a simple configuration.

In the random number generating device of the present invention, one of the at least one predetermined acquisition timing may be a timing at which the receipt of the response from the processing requested object is completed. Waiting for the completion of the receipt of the response can enhance randomness of a random number higher than that of a random number at the timing prior to the completion of the receipt.

In the random number generating device of one aspect of the present invention, it may be configured such that the at least one acquisition timing is a plurality of acquisition timings, and that the random number generation part acquires the count value of the counting part at each of the plurality of acquisition timings, and generates a random number by using a plurality of count values acquired, respectively, at the plurality of acquisition timings.

When the plurality of count values acquired at the plurality of acquisition timings are used to generate a random number as above, greater flexibility in generation of a random number is achieved. For example, if a plurality of random numbers are necessary, the necessary plural number of count values are acquired so as to use each of the acquired count values as a random number. Moreover, for example, any one or a plurality of the plural number of acquired count values may be used as a random number.

In a configuration where the count values are acquired at the plurality of acquisition timings, the random number generation part may generate one random number in accordance with a predetermined random-number generation rule that uses at least two or more of the plurality of count values. By using two or more count values to generate one random number in the above-described manner, a range (e.g., number of digits, randomness, etc.) of a random number can be expanded.

In a configuration where the count values are acquired at the plurality of acquisition timings, it may be preferable that each of the plurality of acquisition timings is set during a reception period from when the receipt of the response is started to when the receipt of the response is completed. By acquiring a necessary number of the count values during the receipt of the response, the plurality of count values can be promptly acquired, and therefore, a large number of random numbers can be generated in a short period of time.

In the random number generating device in one aspect of the present invention, the processing request part may perform the request for processing by transmitting predetermined transmission data; the receiving part may receive reception data having a predetermined number of bits, the reception data being the response from the processing requested object in response to the transmission data; and the at least one acquisition timing may be a predetermined timing predetermined for each of the at least one acquisition timing, the predetermined timing selected from reception timings at each of which data in each bit of the predetermined number of bits constituting the reception data is received after the receipt of the reception data is started.

That is, the acquisition timing may be the following timing: during a process of receiving the reception data by one bit at a time after the receipt of the reception data is started, there are the reception timings, at each of which one bit of the reception data is received; any of these reception timings (predetermined timing) may be configured to be the acquisition timing.

The reception timing for receiving each one bit may be, for example, any timing at which the receipt of the bit is started, at which the receipt of the bit is completed, or during the receipt of the bit. When the acquisition timing is determined based on the reception timing of each of the bits in the above-described manner, it is possible to acquire the count value in a more ensured manner, and therefore, to generate a necessary random number in an ensured manner.

Various devices can be applied as the random number generating device and the processing requested object in one aspect of the present invention. For example, the random number generating device may be installed in an electrical device provided with a predetermined function, and the processing requested object may be a connected device that is used by being connected to the electrical device.

In this case, the random number generating device requests a processing to the connected device that is different from the electrical device to which the random number generating device itself is installed; then, the random number generating device receives a response from the connected device. Accordingly, higher randomness of the random-number element is achieved, thereby allowing generation of a random number having high randomness. Moreover, for example, if the electrical device and the connected device are configured to communicate with each other, such communication can be used to generate a random number; thus, generation of a random number can be achieved more simply and at lower cost.

Alternatively, for example, the random number generating device may be installed in an electrical device provided with a predetermined function, and the processing requested object may be provided inside the electrical device.

In this case, generation of a random number is completed within the electrical device. Accordingly, even if the electrical device is used alone, a random number having high randomness can be generated with a simple configuration.

Furthermore, the random number generating device according to one aspect of the present invention may be realized by software. Specifically, in a microcomputer including a CPU, each of the processing request part, the receiving part, the counting part, and the random number generation part, which are provided in the random number generating device, may be realized by a predetermined program executed by the CPU. When the CPU is configured to function as the random number generating device as above, the constitution of the random number generating device can be more simplified.

In a case where one aspect of the random number generating device of the present invention is realized by executing the predetermined program by the CPU in the microcomputer, the processing requested object may be a peripheral that communicates with the CPU inside the microcomputer. Generally, inside the microcomputer, the CPU communicates with various peripherals. In the communication between the CPU and the peripheral as well, there may arise time uncertainty (random-number element) depending on a condition of a transmission path between the CPU and the peripheral, an operating condition and performance of the CPU and the peripheral, etc.

In view of the above, the following may be proposed: by utilizing the communication with the various peripherals, for example, if the CPU sends a request for processing to a peripheral and in response to this request, the CPU receives a response from the peripheral as the processing requested object, a count value is acquired based on the response to generate a random number. In this configuration as well, it is possible to generate a random number having high randomness with a simple configuration.

When a random number is generated based on the communication between the CPU and the peripheral as described above, the peripheral may be, for example, a memory in which a stored content is rewritable. In this case, it may be configured such that the processing request part makes a request for a predetermined processing with respect to the stored content of the memory, and one of the at least one acquisition timing is set based on a receiving timing at which a signal is received, the signal being outputted as the response from the memory when the predetermined processing requested is completed in the memory.

Inside the microcomputer, a response time period when the CPU requests a predetermined processing to the memory varies depending on a use environment, use condition, etc. of the microcomputer; this variation is uncertain element (random-number element). Therefore, it is more preferable to use the memory as the peripheral for random-number generation.

BRIEF DESCRIPTION OF THE DRAWINGS

The invention will now be described below, by way of example, with reference to the accompanying drawings, in which.

DETAILED DESCRIPTION OF THE PREFERRED EMBODIMENTS

[First Embodiment]

1. Structure of Electric Power Tool and Battery Pack

A random number generating device of the present embodiment is realized as a function of an electric power tool 3 that is configured to operate when a battery pack 1 is attached thereto. The battery pack 1 is configured to be attachable to and detachable from the electric power tool 3. When the battery pack 1 is attached to the electric power tool 3, the electric power tool 3 determines (authenticates) whether or not the battery pack 1 is a proper battery pack by using a random number. If the battery pack 1 is determined to be a proper battery pack, the electric power tool 3 starts operation by an electric power supplied from the battery pack 1. The battery pack 1 is configured to be able to charge a battery 10 provided therein from a battery charger 7 (which is not shown and not described in the present embodiment; see FIG. 12, which will be described later).

Figure 1:
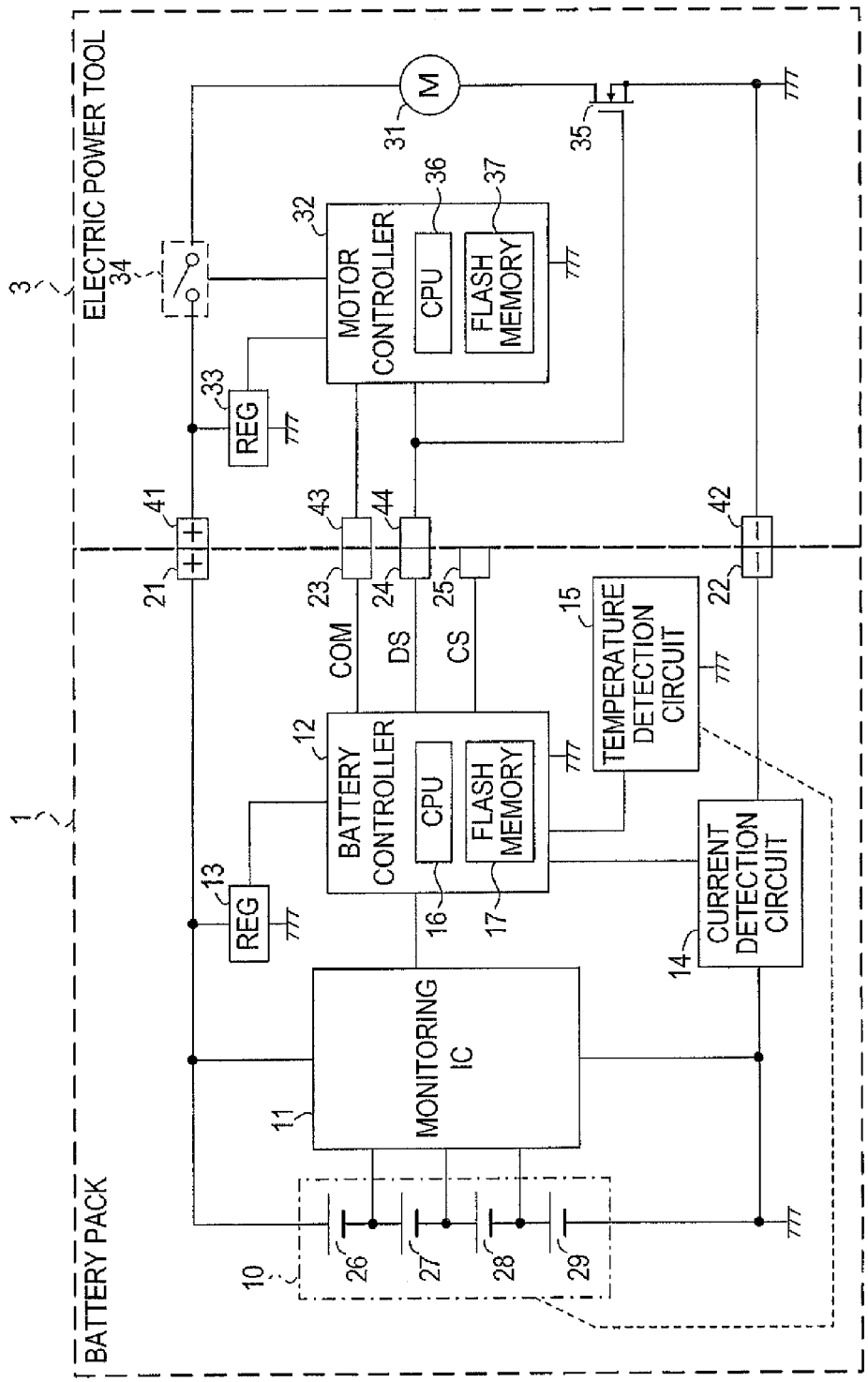
FIG. 1 is an illustrative view showing a schematic configuration of a battery pack and an electric power tool of a first embodiment.

As shown in FIG. 1, the battery pack 1 is configured to be attachable to and detachable from the electric power tool 3 and various electric devices (not shown), and is used as a power source for the electric power tool 3 and the various electric devices.

The battery pack 1 is provided with the battery 10, a monitoring IC 11, a battery controller 12, a regulator 13, a current detection circuit 14, a temperature detection circuit 15, a positive electrode terminal 21, a negative electrode terminal 22, a common communication terminal 23, a discharge-control communication terminal 24, and a charge-control communication terminal 25.

The battery 10 is constituted of a plurality of (four in the present embodiment) battery cells 26 to 29 connected in series. A positive electrode of the battery 10 (i.e., positive electrode of the battery cell 26 on a highest potential side) is connected to the positive electrode terminal 21. A negative electrode of the battery 10 (i.e., negative electrode of the battery cell 29 on a lowest potential side) is connected to the negative electrode terminal 22 via the current detection circuit 14. The battery 10 is a rechargeable battery (e.g., lithium-ion rechargeable battery) that can be charged repeatedly.

The monitoring IC 11 is an integrated circuit (IC) for monitoring the battery 10, and has a voltage monitoring function and an abnormality monitoring function. The voltage monitoring function is a function of detecting a voltage of the battery 10 and a voltage (cell voltage) of each of the battery cells 26 to 29 to output the detected voltages to the battery controller 12. The abnormality monitoring function is a function of monitoring the respective cell voltages of the battery cells 26 to 29 and, when at least one of the cell voltages is in an overvoltage state, outputting, to the battery controller 12, a signal (overvoltage signal) indicating generation of the overvoltage.

The regulator 13 is a power supply circuit that lowers a voltage of the battery 10 to generate a control voltage having a predetermined voltage value. The monitoring IC 11 and the battery controller 12 are operated by this control voltage.

The current detection circuit 14 is provided in a current path extending from the negative electrode terminal 22 to the negative electrode of the battery 10. The current detection circuit 14 detects an electric current flowing through this current path, i.e., a charge current to be charged to the battery 10 and a discharge current discharged from the battery 10.

The temperature detection circuit 15 detects a temperature of the battery 10 based on a detection signal from a temperature detection element (which is not shown and is, for example, a thermistor) provided in the vicinity of the battery 10. The temperature detection circuit 15 outputs results of the detection to the battery controller 12.

The battery controller 12 is a microcomputer provided with various functions. The various functions include: a function of obtaining a voltage of the battery 10 and a cell voltage of each of the battery cells 26 to 29 from the monitoring IC 11 so as to monitor these voltages; a function of performing a predetermined protection operation when an overvoltage signal is outputted from the monitoring IC 11; a remaining-battery-capacity calculation function that calculates a remaining battery capacity of the battery 10; a function of performing a predetermined protection operation when a temperature of the battery 10 exceeds a predetermined upper limit value; a function of performing data communication with a motor controller 32 of the electric power tool 3; and so on.

The various functions including the above functions provided in the battery controller 12 are realized mainly by executing various programs stored in a flash memory 17 by a CPU 16.

Here, it is not necessary that the functions of the battery controller 12 are realized by a microcomputer. The functions of the battery controller 12 can be realized in various forms, and for example, may be constituted of an IC formed of various logic circuits, etc. Likewise, the motor controller 32, an adaptor controller 51 (see FIG. 6A), and a charge controller 73 (see FIG. 12), all of which will be described later, may be constituted in various forms.

The battery controller 12 is connected to the common communication terminal 23, the discharge-control communication terminal 24, and the charge-control communication terminal 25. The battery controller 12 is configured to be capable of performing data communication with various electrical equipments to be connected to the battery pack 1, via these communication terminals 23 to 25. When the battery pack 1 is attached to the electric power tool 3, the common communication terminal 23 of the battery pack 1 is connected to a common communication terminal 43 of the electric power tool 3, and the discharge-control communication terminal 24 of the battery pack 1 is connected to a discharge-control communication terminal 44 of the electric power tool 3.

When receiving data from the motor controller 32 of the electric power tool 3 via the common communication terminal 23, the battery controller 12 performs various processes based on the received data. If it is necessary to respond to the received data, the battery controller 12 transmits response data to the motor controller 32 of the electric power tool 3 via the common communication terminal 23.

When the battery pack 1 is attached to the electric power tool 3 and electric power of the battery 10 is being supplied to the electric power tool 3, if a discharge current from the battery 10 is in an overcurrent state or a temperature of the battery 10 exceeds an upper limit value, the battery controller 12 outputs an abnormal signal (e.g., Low-level signal) indicating the overcurrent state or the excessive temperature, to the electric power tool 3 via the discharge-control communication terminal 24. The charge-control communication terminal 25 is used for data communication between the battery pack 1 and the battery charger 7.

As shown in FIG. 1, the electric power tool 3 is provided with a motor 31, the motor controller 32, a regulator 33, a trigger switch 34, a drive switching element 35, a positive electrode terminal 41, a negative electrode terminal 42, the common communication terminal 43, and the discharge-control communication terminal 44.

The positive electrode terminal 41 is connected to one end of the motor 31 via the trigger switch 34. The negative electrode terminal 42 is connected to the other end of the motor 31 via the drive switching element 35. The motor 31 of the present embodiment is a brushed direct current (DC) motor.

The regulator 33 is a power supply circuit that, when the battery pack 1 is attached to the electric power tool 3, lowers a voltage supplied from the battery 10 to generate a control voltage having a predetermined voltage value. The motor controller 32 is operated by this control voltage.

The trigger switch 34 is turned on and off when a user operates a trigger (not shown) provided in the electric power tool 3. Specifically, the trigger switch 34 is turned on when the user pulls the trigger, while the trigger switch 34 is turned off when the user releases the trigger. Information on on-and-off states of the trigger switch 34 is inputted to the motor controller 32.

The motor controller 32 performs various functions when a CPU 36 executes various programs stored in a flash memory 37. The motor controller 32 is provided with a RAM, an A/D converter, and an I/O interface (all of which are not shown in FIG. 1; see FIG. 7, which will be described later), in addition to the CPU 36 and the flash memory 37.

When the trigger switch 34 is turned on, the motor controller 32 turns on the drive switching element 35 to start conduction of electric current from the battery pack 1 to the motor 31, thereby operating the motor 31. When the trigger switch 34 is turned off, the motor controller 32 turns off the drive switching element 35 to interrupt the conduction of electric current to the motor 31. Here, the drive switching element 35 is an N-channel MOSFET in the present embodiment; however, this is merely one example.

When a signal indicating abnormality is inputted to the motor controller 32 from the battery pack 1 via the discharge-control communication terminal 44 during the conduction of electric current to the motor 31 by the motor controller 32 (i.e., during discharge from the battery 10), the drive switching element 35 is forcedly turned off. Consequently, the conduction of electric current to the motor 31 is forcedly suspended.

The motor controller 32 includes, in addition to the aforementioned current-conduction control of the motor 31, a battery-pack authentication function that authenticates whether or not the battery pack 1 is a proper battery pack. When the battery pack 1 is determined to be a proper battery pack by the battery-pack authentication function, the motor controller 32 performs conduction of electric current to the motor 31 based on an operation state of the trigger switch 34.

Authentication of a battery by the motor controller 32 is performed in the following manner. The motor controller 32 generates random-number data and transmits, to the battery controller 12 in the battery pack 1, authentication data generated by adding predetermined encrypted data to the random-number data.

Upon receipt of the authentication data from the motor controller 32, the battery controller 12 generates reply data based on the received authentication data and transmits the reply data to the motor controller 32. When receiving the reply data from the battery controller 12, the motor controller 32 performs authentication of the battery pack 1 based on the received reply data.

A more detailed process of the battery-pack authentication function using a random number is described in detail, for example, in US patent application publication No. 2012/0235628A1. The disclosure of the US patent application publication No. 2012/0235628A1 is incorporated herein by reference.

2. Description of Random-Number Generation Method

Next, explanations will be given with respect to a method of generating random-number data that is generated when the motor controller 32 of the electric power tool 3 performs the aforementioned battery pack authentication. In the present embodiment, the CPU 36 of the motor controller 32 performs data communication with the CPU 16 of the battery controller 12, thereby generating random-number data.

Specifically, the CPU 36 of the motor controller 32 acts as a master and transmits, to the battery controller 12, predetermined data for random-number generation. In the aforementioned data communication, the CPU 16 of the battery controller 12 acts as a slave. In response to the transmitted data, the CPU 16 transmits predetermined response data to the motor controller 32.

The motor controller 32 acting as the master constantly increments a loop counter variable with each control cycle, while transmitting the predetermined data for random-number generation to the battery controller 12. The loop counter in the present embodiment is a one-byte software counter, which is realized by executing a predetermined loop counter program by the CPU 36. Therefore, the loop counter variable is sequentially incremented from 0 to 255 with a predetermined control cycle. When the loop counter variable overflows (in other words, after the loop counter variable becomes 255), the loop counter variable is incremented from 0 again.

When the CPU 36 acting as the master receives the response data from the battery controller 12, the CPU 36 acquires a count value K of the loop counter at a predetermined acquisition timing during receipt of the response data. The CPU 36 retains (for example, stores in the RAM) the acquired count value K as preliminary random-number data.

In the descriptions hereinafter, components (i.e., the CPU 36 of the motor controller 32 in the present embodiment) that transmit predetermined data for random-number generation and generate a random number are also simply referred to as "master", while components (i.e., the CPU 16 of the battery controller 12 in the present embodiment) that send predetermined response data in response to the transmission data from the master are also simply referred to as "slave".

Figure 2:
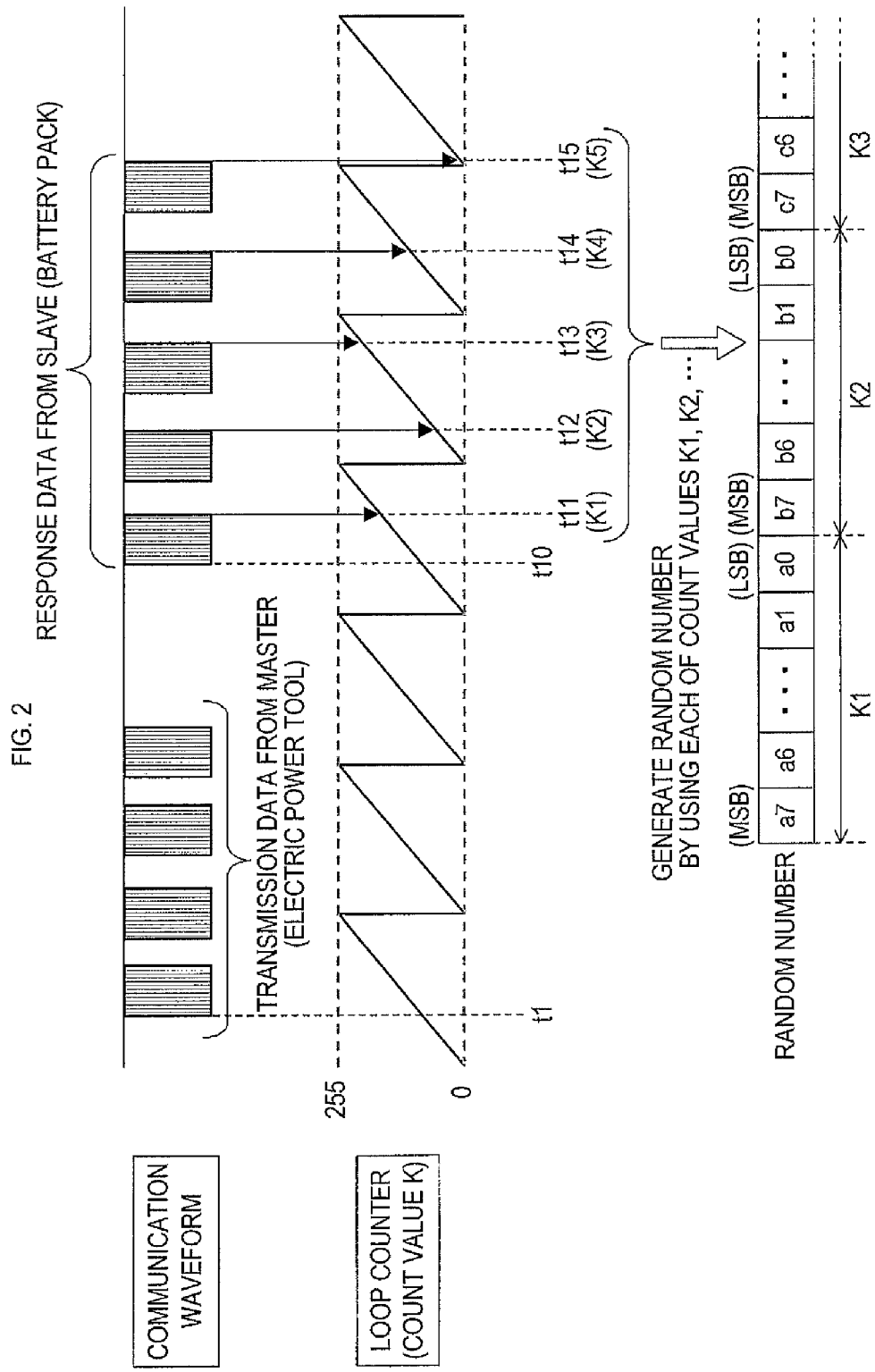
FIG. 2 is an illustrative view for illustrating a random-number generation method of the first embodiment.

FIG. 2 illustrates an example in which transmission of transmission data from the master is started at time t1, and in response to the transmission data, receipt of response data from the slave is started at time t10. The example in FIG. 2 will be described in detail.

The master transmits the transmission data at time t1, while starting the loop counter operating prior to such transmission of the transmission data. In the master, receipt of the response data from the slave in response to the transmission data is started at time t10. The response data from the slave is data in a predetermined format. In the present embodiment, the response data is, for example, data as a whole having an information amount of 5 bytes.

In the present embodiment, the acquisition timing for acquiring the count value K of the loop counter at the time of receiving the response data in the master is set at each completion of receipt of 1 byte of data. In other words, each time when 1 byte of the response data is received, the count value K of the loop counter at the time of such receipt is acquired.

Specifically, after receipt of the response data is started at time t10, at time t11, receipt of 1 byte of data is completed. At this time t11, the master acquires a count value K1 of the loop counter and retains the count value K1 as preliminary random-number data. When receipt of another 1 byte of data is completed (time t12), the master acquires a count value K2 of the loop counter at time t12 and retains the count value K2 as preliminary random-number data. Thereafter, in the same manner, the master successively acquires count values K3, K4, and K5 of the loop counter, respectively, at times t13, t14, and t15, at each of which receipt of 1 byte of data is completed. The master retains each of the count values K3, K4, and K5 as preliminary random-number data. In the present embodiment, time t15 as a fifth acquisition timing is also a timing at which receipt of the response data is completed.

The master eventually generates one set of random-number data in accordance with a predetermined random-number generation rule in which the acquired count values K1 to K5 are used.

Specifically, as shown in FIG. 2, the count values K1 to K5, each of which consists of 1 byte (8 digits in binary representation), are sequentially aligned toward right in the order from K1 to K5 (i.e., next to the right of an LSB of an earlier acquired count value K, a subsequently acquired count value K is aligned in the order from an MSB to an LSB thereof), thereby generating one set of random-number data consisting of 40 binary digits as a whole.

More specifically, next to the right of "a0" as an LSB of the count value K1 acquired firstly, the master aligns the count value K2 acquired secondly in the order from "b7" as an MSB of the count value K2. Then, next to the right of "b0" as an LSB of the count value K2, the master aligns the count value K3 acquired thirdly in the order from "c7" as an MSB of the count value K3. In the same manner, the master aligns the count values sequentially until alignment of the count value K5 acquired fifthly is completed, thereby generating one set of random-number data.

As described above, in the present embodiment, it is configured to generate random-number data having a larger number of bits (40 bits) than a number of bits (1 byte) of the loop counter. Accordingly, it is configured such that a count value of the loop counter is acquired at a necessary number of times (five times in the present embodiment).

Therefore, for example, if necessary random-number data is n bytes, a count value K of the loop counter may be acquired at n times, and n pieces of the count values K may be used to generate one set of random-number data of n bytes. Alternatively, a count value K of the loop counter may be acquired at more than n times, and these count values K may be appropriately selected, calculated, etc., so as to generate one set of the necessary random-number data of n bytes.

Moreover, if a number of bits of necessary random-number data is equal to or less than a number of bits of the loop counter, one count value K of the loop counter may be acquired and the one count value K of the loop counter may be used as it is (or, a necessary number of bits taken from the one count value K may be used), thereby generating the necessary random-number data.

Furthermore, for example, if a plurality of sets of random-number data are separately necessary, each of the plurality of sets of random-number data having a number of bits equal to or less than a number of bits of the loop counter, the count value K may be acquired at the necessary plurality of times, thereby retaining each of the acquired count values K as random-number data.

Still further, for example, if a plurality of sets of random-number data are separately necessary, each of the plurality of sets of random-number data having a number of bits larger than a number of bits of the loop counter, the count value K may be acquired at a number of times, the number calculated by multiplying a number required to generate one set of random-number data by the plural number of the plurality of sets of random-number data to be generated, thereby generating the necessary random-number data.

In any of the above cases, specific timing at which the count value K is acquired may be appropriately determined based on a necessary number of the count values K, reception timing (reception period) of the response data, etc.

The reception timing of the response data from the slave in response to the transmission data from the master is predefined in theory and design. However, in practice, the reception timing of the response data may deviate from the predefined time depending on a condition of a data communication path between the master and the slave, variation in a data processing time occurred both in the master and in the slave, etc. This deviation becomes a random-number element and appears as a variation in the count value K of the loop counter (i.e., variation having high randomness). Thus, the count value K can be used as random-number data.

As a time period from transmitting data to acquiring the count value K is longer, the degree of randomness becomes higher. For this reason, in a case where one set of random-number data is necessary, if priority is placed on a high degree of randomness, it is preferable to acquire the count value K at a receipt-completion timing (time t15).

If only the high degree of randomness is taken into account, a timing later than the receipt-completion timing is desirable for acquiring the count value K. However, if the receipt-completion timing has passed, grounds for determining at which timing the count value K is to be acquired becomes separately necessary. Furthermore, a time period until generation of random-number data becomes longer.

Thus, in order to promptly generate random-number data at an appropriate timing while having a high degree of randomness, it is preferable to acquire the count value K especially at a timing closer to the receipt-completion timing during the reception period of the response data.

3. Description of Processes Executed in Master and Slave for Generation of Random-Number Data With reference to flowcharts of FIGS. 3 to 5, explanations will be given with respect to various processes carried out in the master and the slave to realize the aforementioned random-number generation method described with reference to FIG. 2.

Firstly, with reference to FIG. 3, explanations will be given with respect to a master-side loop counter process executed by the CPU 36 of the motor controller 32 provided in the electric power tool 3; the CPU 36 acts as the master.

Figure 3:
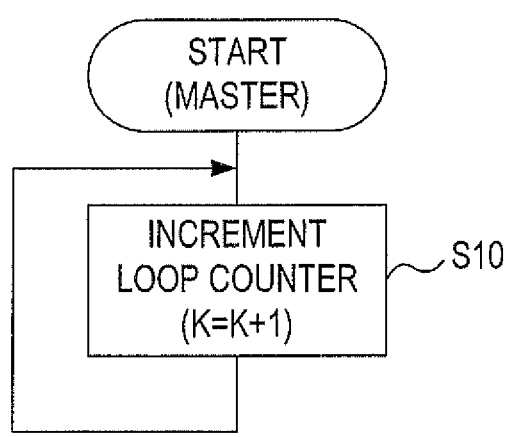
FIG. 3 is a flowchart showing a master-side loop counter process of the first embodiment.

When the motor controller 32 is supplied with electric power and starts its operation, the CPU 36 as the master reads a program for the master-side loop counter process in FIG. 3 from the flash memory 37 and executes this program.

When the master-side loop counter process is started, the master increments the count value K of the loop counter by one in S10. During operation, the master repeatedly executes this process of S10 with each control cycle. Accordingly, while the master is operating, the count value K of the loop counter is constantly incremented with the control cycle.

Next, a master-side random number generation process executed by the master will be described with reference to FIG. 4.

Figure 4:
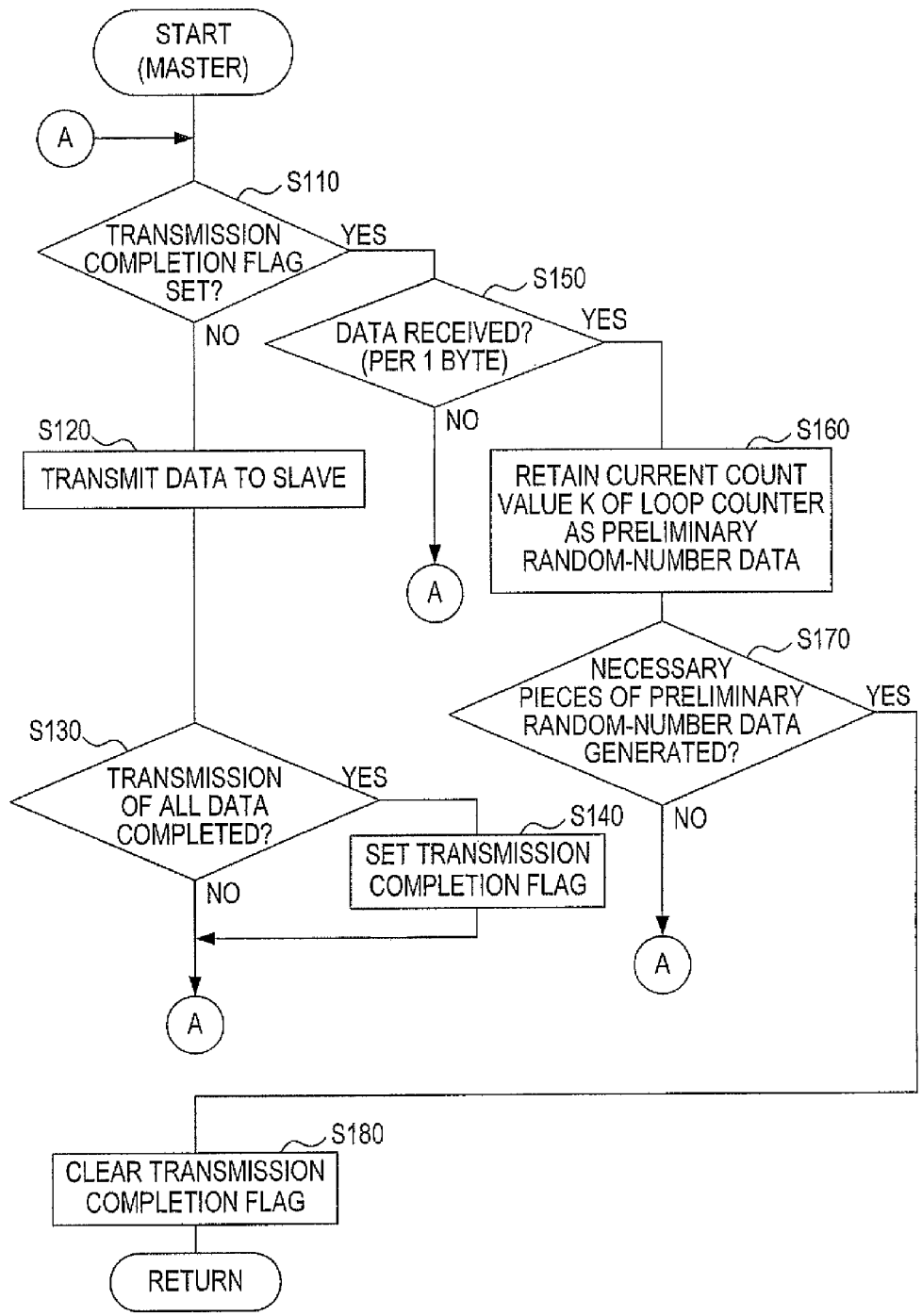
FIG. 4 is a flowchart showing a master-side random number generation process of the first embodiment.

After start operating, the master reads a program for the master-side random number generation process in FIG. 4 from the flash memory 37 and executes this program, when a timing at which a random number becomes necessary arrives. Such a timing is, for example, an authentication timing immediately after the battery pack 1 is connected, a predetermined authentication timing while the battery pack 1 is connected.

When the master-side random number generation process is started, the master determines in S110 whether or not a transmission completion flag has been set. This transmission completion flag is to be set in S140, which will be described later. If the transmission completion flag has been set, the process proceeds to s150. On the other hand, if the transmission completion flag has not been set, the process proceeds to S120.

In S120, the master transmits predetermined data for random-number generation to the slave. In S130, the master determines whether or not transmission of all data to be transmitted has been completed. If the transmission of all data has not been completed, the process returns to S110 and the master continues transmitting the data. However, if the transmission of all data has been completed, the transmission completion flag is set in S140 and then, the process returns to S110.

When the process proceeds to S150 since it was determined in S110 that the transmission completion flag has been set, the master determines whether or not data has been received from the slave. More specifically, the master determines whether or not receipt of 1 byte of the response data from the slave has been completed. The process returns to S110 until 1 byte of the response data is received. However, when receipt of 1 byte of the response data is completed, the process proceeds to S160.

In S160, the master acquires a current count value K of the loop counter and retains the acquired count value K as preliminary random-number data. In S170, the master determines whether or not necessary pieces of preliminary random-number data have been generated. In the present embodiment, five count values K in total are necessary to generate one set of random-number data. Accordingly, in the present embodiment, the determination process in S170 is to determine whether or not five count values K have been acquired and retained. If the necessary pieces of preliminary random-number data have not yet been generated, the process returns to S110. In this case, the process waits to newly receive 1 byte of the response data in S150. When 1 byte of the response data is received, the process proceeds to S160 to acquire and retain the count value K at that time.

If the master determines in S170 that the necessary pieces of preliminary random-number data have been generated, the transmission completion flag is cleared in S180, and then, the current master-side random number generation process is terminated.

Next, a slave-side reception-response process executed by the slave will be described with reference to FIG. 5. After start operating, the slave reads a program for the slave-side reception-response process in FIG. 5 from the flash memory 17 and repeatedly executes this program.

When the slave-side reception-response process is started, the slave determines in S210 whether or not a "response-in-process" flag has been set. This response-in-process flag is to be set in S240, which will be described later. If the response-in-process flag has been set, the process proceeds to S250. On the other hand, if the response-in-process flag has not been set, the process proceeds to S220.

In S220, the slave determines whether or not the predetermined data for random-number generation has been received from the master. If the predetermined data for random-number generation has not been received, the process returns to S210. On the other hand, if the predetermined data for random-number generation has been received, the process proceeds to S230.

In S230, the slave determines whether or not receipt of a prescribed number of sets (number of bits) of data as prescribed for data for random-number generation has been completed. If receipt of the prescribed number of sets of data has not been completed, the process returns to S210 to continue the reception of the data. If receipt of the prescribed number of sets of data has been completed, the response-in-process flag is set in S240; then, the process returns to S210.

When the process proceeds to S250 since it was determined in S210 that the response-in-process flag has been set, the slave sends predetermined response data to the master. In S260, the slave determines whether or not sending of all of the response data has been completed. If sending of all of the response data has not been completed, the process returns to S210 and the slave continues the sending. If sending of all of the response data has been completed, the response-in-process flag is cleared in S270; then, the current slave-side reception-response process is terminated.

4. Effects, etc. of First Embodiment

As described above, in the present embodiment, if random-number data is necessary, the master transmits the predetermined data to the slave, while operating the loop counter. When the slave receives the predetermined data from the master, the slave sends the response data to the master. The master sequentially acquires the necessary number of the count values K (K1 to K5 in the present embodiment) at the predetermined acquisition timings during the reception period of the response data, and uses these plural number of the count values K to generate necessary random-number data.

There arises time uncertainty (random-number element) during a period from when the master transmits the transmission data to when the master receives the response data. Consequently, the count value K acquired during receipt of the response data has high randomness. Accordingly, the master can generate random-number data having high randomness, even with a simple configuration.

Moreover, at least one of timings at which the master acquires the count values K of the loop counter is a timing (time t15 in FIG. 2) at which receipt of the response data from the slave is completed. The later the acquisition timing is, the higher the degree of randomness in the acquired count value K becomes. Therefore, by acquiring the count value K at the time of completion of receipt of the response data, random-number data having higher randomness can be generated.

Furthermore, the master acquires the count values K at a plurality of acquisition timings, and uses the plurality of the acquired count values K to generate random number data. FIG. 2 illustrates the example of generating one set of random-number data with five count values K. However, how many count values K are to be acquired can be appropriately determined based on a number or a size (number of bits, etc.) of necessary random-number data, as described above.

As above, by using the plurality of the count values K acquired at the plurality of acquisition timings to generate one set or a plurality of sets of random-number data, greater flexibility in generation of a random number is achieved. Consequently, it is possible to generate a desired number and size of random-number data in an easy and appropriate manner. In particular, generation of one set of random-number data by using a plurality of count values K makes it possible to expand a length (e.g., number of digits, randomness, etc.) of a random number that can be generated.

Moreover, in order to acquire a plurality of count values K, the master is configured to acquire each of the plurality of count values K during the reception period of the response data (during a period from time t10 to time t15 in FIG. 2).

Furthermore, each of the acquisition timings is based on a number of received bits of the response data (per 1 byte in the present embodiment). By acquiring a necessary number of count values K based on the number of the received bits during receipt of the response data, the plurality of count values K can be acquired in a prompt and ensured manner. Thus, desired random-number data can be generated in a prompt and ensured manner.

In the present embodiment, the electric power tool 3 operates as the master; the battery pack 1, which is a separate component from the electric power tool 3 and is to be used by being attached to the electric power tool 3, operates as the slave. That is, generation of a random number is performed by utilizing data communication between these two devices, which are configured to be independent and separate from each other. Therefore, it is possible to generate a random number having high randomness in a simpler manner and at a lower cost.

In the present embodiment, the electric power tool 3 corresponds to an example of an electrical device of the present invention; the battery pack 1 corresponds to an example of a connected device of the present invention; the CPU 36 (master) of the electric power tool 3 corresponds to an example of each of a processing request part, a receiving part, a counting part, and a random number generation part of the present invention; and the CPU 16 (slave) of the battery pack 1 corresponds to an example of a processing requested object of the present invention.

The master-side loop counter process in FIG. 3 corresponds to an example of a process executed by the counting part of the present invention. In the master-side random number generation process in FIG. 4, the process in S120 corresponds to an example of a process executed by the processing request part of the present invention, the process in S150 corresponds to an example of a process executed by the receiving part of the present invention, the processes in S160 and S170 correspond to an example of a process executed by the random number generation part of the present invention.

[Second Embodiment]

Figure 6A:
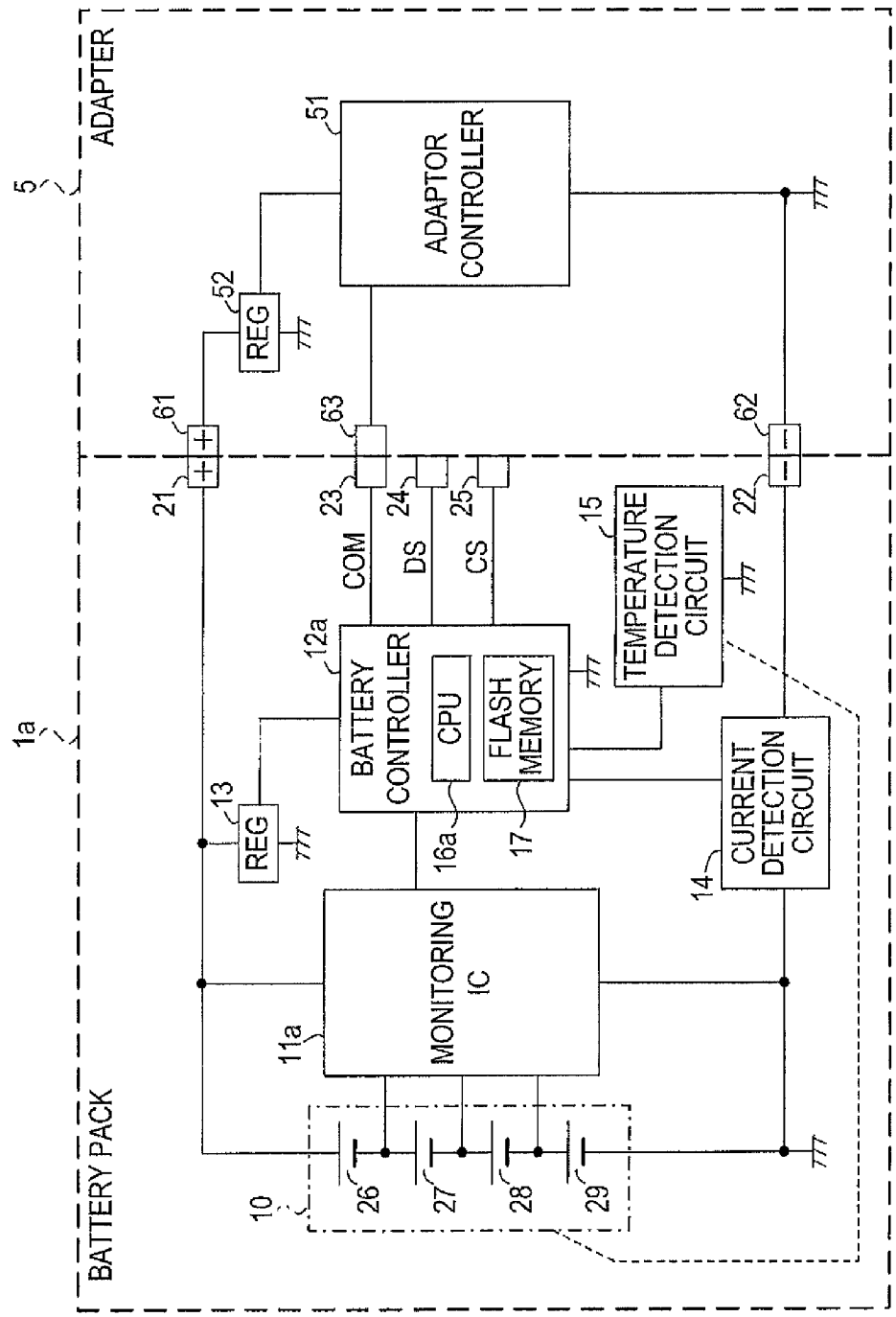
FIGS. 6A to 6C are illustrative views, each of which shows a schematic configuration of a battery pack and an adapter of a second embodiment.

Next, the second embodiment of the present invention will be described. As shown in FIG. 6A, a random number generating device of the present embodiment is realized as a function of a battery pack 1a. The battery pack 1a uses random-number data generated by itself for authentication performed by an adapter 5. Specifically, when responding to an authentication request from the adapter 5 with reply data, the battery pack 1a adds the random-number data generated by the battery pack 1a itself to the reply data.

As shown in FIG. 6A, the battery pack 1a is configured to be attachable to and detachable from the adapter 5 and is used as a power source for the adapter 5. A hardware configuration of the battery pack 1a is the same as that of the battery pack 1 in the first embodiment. Accordingly, in FIG. 6A, the same components of the battery pack 1a as those in FIG. 1 are given with the same reference numerals.

When being attached to the battery pack 1a, the adapter 5 reads various kinds of information stored in a battery controller 12a of the battery pack 1a and controls a function provided in the adapter 5 based on the read information.

One example of the function of the adapter 5 is a control of an electric current in an LED light (not shown) provided in the adapter 5. The adapter 5 is configured to be attached to battery packs with various rated voltages. Accordingly, the adapter 5 reads voltage information stored in the battery controller 12a of the battery pack 1a to control an electric current to be supplied to the LED light such that the electric current is constant. This function is realized by the adaptor controller 51. Since constitutions and functions of the adapter 5 are not main features of the present invention, detailed explanations of the adapter 5 are not provided herein.

There are various kinds of data communication between a CPU 16a of the battery controller 12a, and a monitoring IC 11a. One of such data communication is data communication to allow the CPU 16a to acquire battery information (voltage of the battery 10, cell voltage of each of the battery cells 26 to 29, battery temperature, etc.) from the monitoring IC 11a.

Specifically, the CPU 16a transmits predetermined request data for requesting battery information to the monitoring IC 11a. Upon receipt of the request data, the monitoring IC 11a sends response data containing the requested battery information in accordance with the request data. The CPU 16a receives the response data from the monitoring IC 11a to thereby obtain desired battery information.

The CPU 16a generates random-number data by utilizing the aforementioned data communication for obtaining battery information. That is, in the present embodiment, in the battery pack 1a, the CPU 16a of the battery controller 12a operates as a master, while the monitoring IC 11a operates as a slave, thereby generating random-number data at the master.

In the same manner as in the first embodiment, the master executes the master-side loop counter process in FIG. 3 and the master-side random number generation process in FIG. 4 to generate a random number. However, transmission data that is transmitted by the master is not the data for random-number generation but the aforementioned transmission data that is normally transmitted for obtaining battery information.

Figure 5:
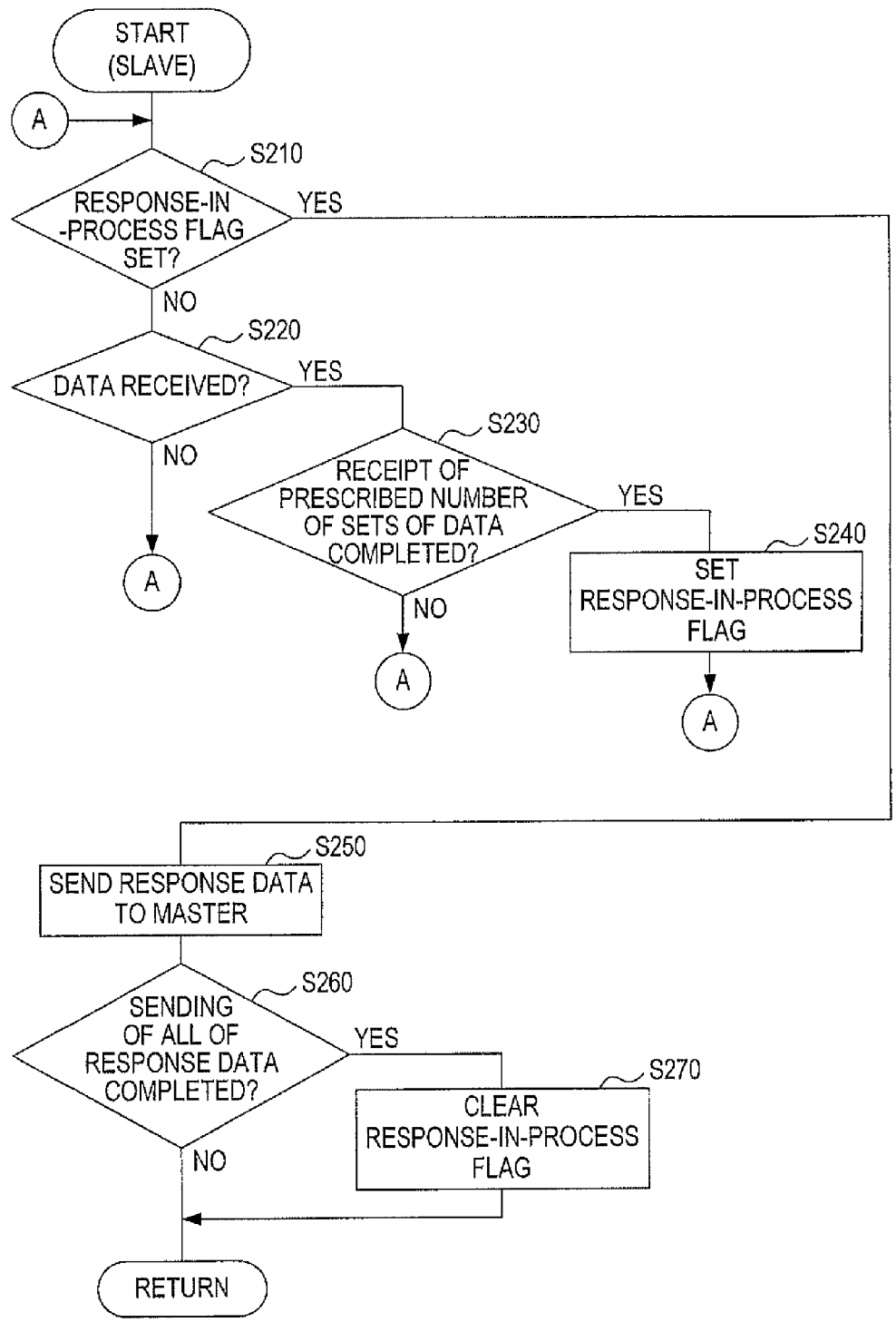
FIG. 5 is a flowchart showing a slave-side reception-response process of the first embodiment.

In the same manner as in the first embodiment, the slave executes the slave-side reception-response process in FIG. 5 to send response data in response to the transmission data for random-number generation from the master.

As described above, in the present embodiment, inside the battery pack 1a, the CPU 16a acting as the master generates random-number data by using data communication with the monitoring IC 11a acting as the slave. Accordingly, the battery pack 1a of the present embodiment can generate, by the battery pack 1a alone, random-number data having high randomness even with a simple configuration.

Figure 6B:
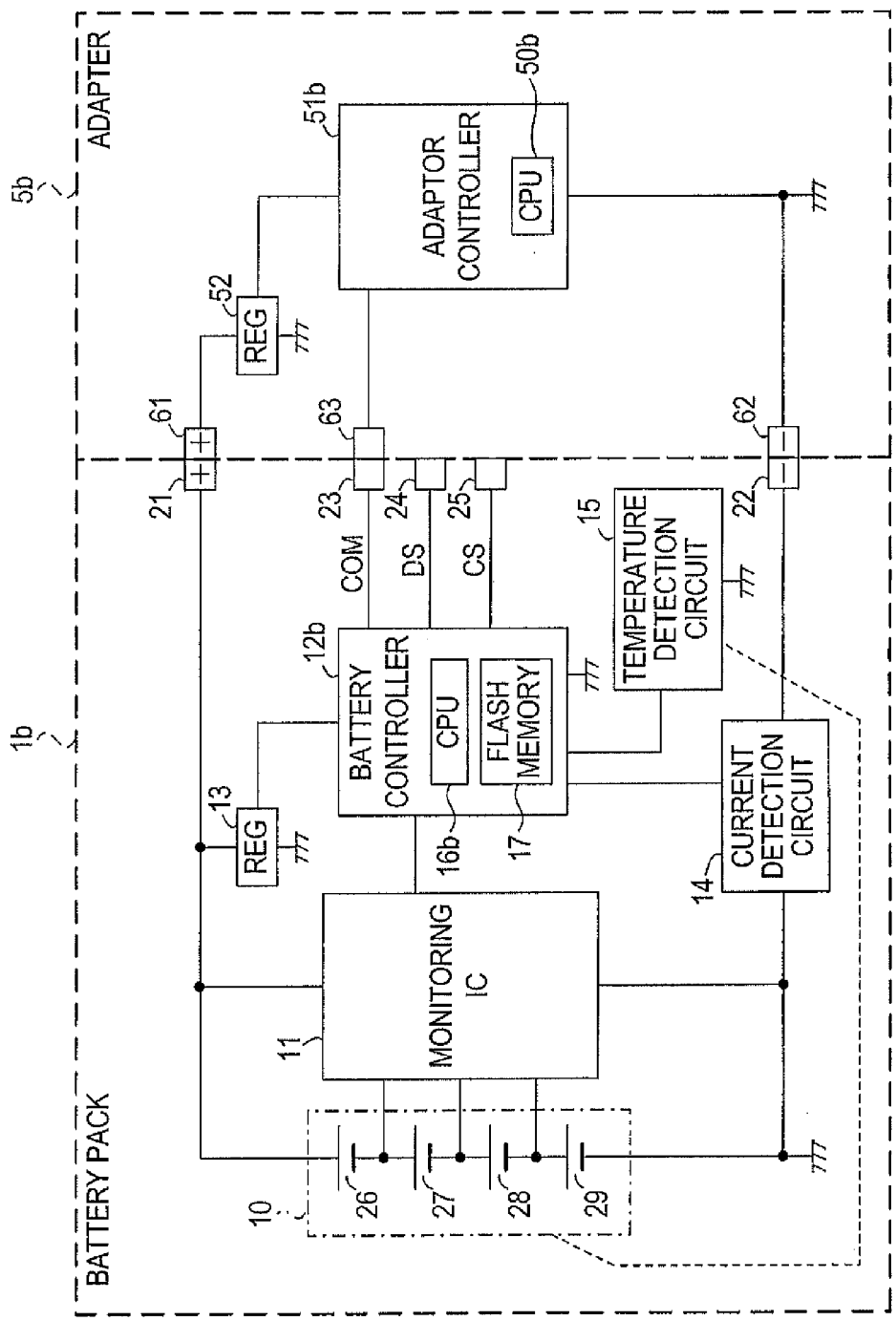

In the present embodiment, a configuration is described in which the master and the slave are provided inside the battery pack 1a and generation of random-number data is realized by the battery pack 1a alone. However, it may be configured such that, as shown in FIG. 6B, a CPU 50b inside an adaptor controller 51b of an adapter 5b acts as a master, and a CPU 16b of a battery controller 12b inside a battery pack 1b acts as a slave, thereby allowing the master to generate random-number data by bidirectional data communication between the master and the slave. Furthermore, it may be configured such that the master and the slave in FIG. 6B are interchanged with each other; that is, as shown in FIG. 6C, a CPU 16c of a battery controller 12c inside a battery pack 1c acts as a master, and a CPU 50c inside an adaptor controller 51c of an adapter 5c acts as a slave, thereby allowing the master to generate random-number data by bidirectional data communication between the master and the slave.

Figure 6C:
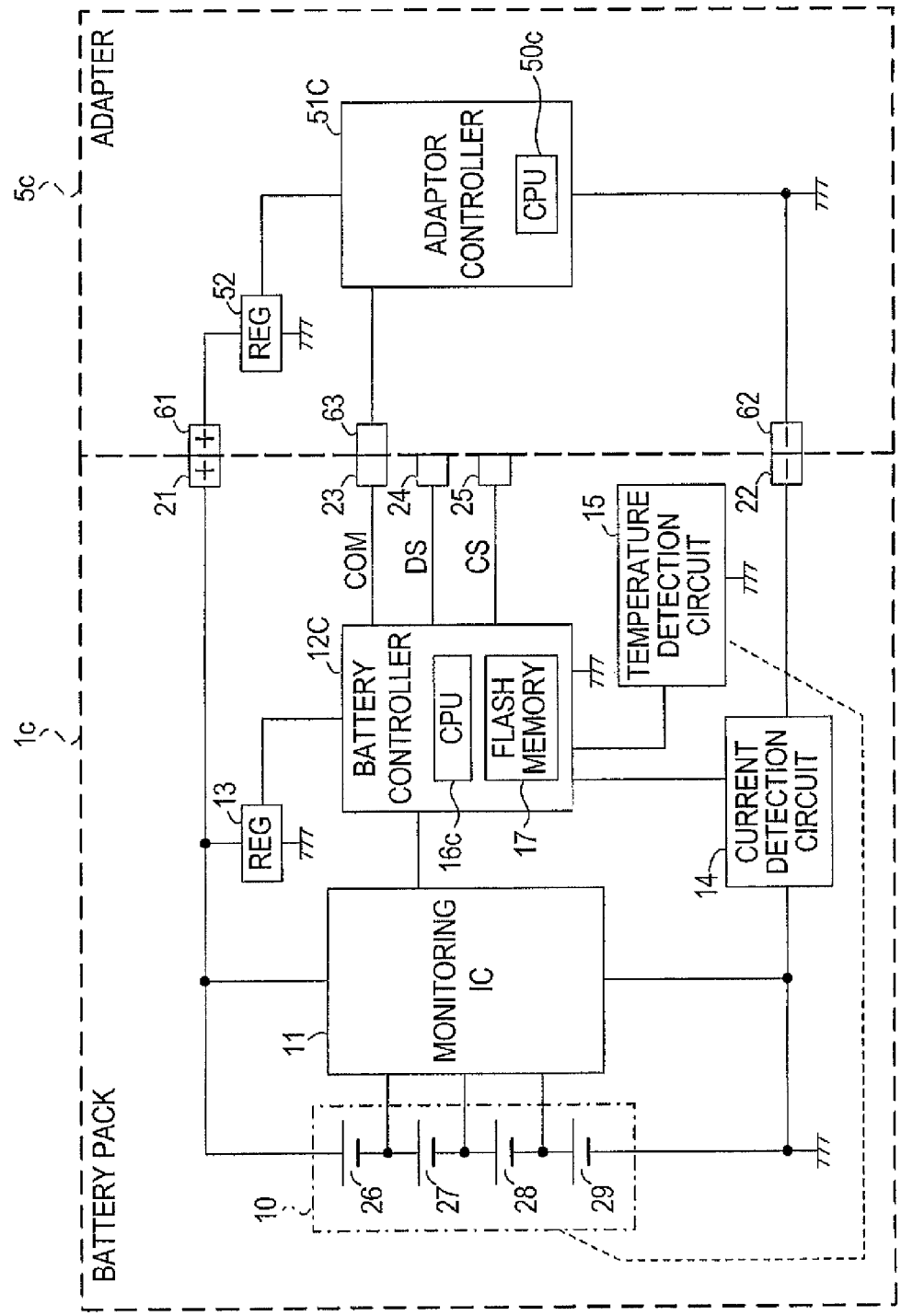

In the embodiments in FIGS. 6A and 6C, the battery packs 1a and 1c correspond to an example of an electrical device of the present invention. In the embodiment in FIG. 6B, the adapter 5b corresponds to an example of an electrical device of the present invention.

[Third Embodiment]

Next, the third embodiment of the present invention will be described. In the present embodiment, explanations will be given by using the connection configuration of the battery pack 1 and the electric power tool 3 in the first embodiment shown in FIG. 1.

A random number generating device of the present embodiment is realized as a function of the electric power tool 3. Here, in the first embodiment, it is described that components in the electric power tool 3 act as the master and components in the battery pack 1 act as the slave and that as a result of bidirectional communication between the master and the slave, random-number data is generated at the master. However, in the present embodiment, as shown in FIG. 7, random-number data is generated by data communication inside a motor controller 32a of an electric power tool 3a.

Figure 7:
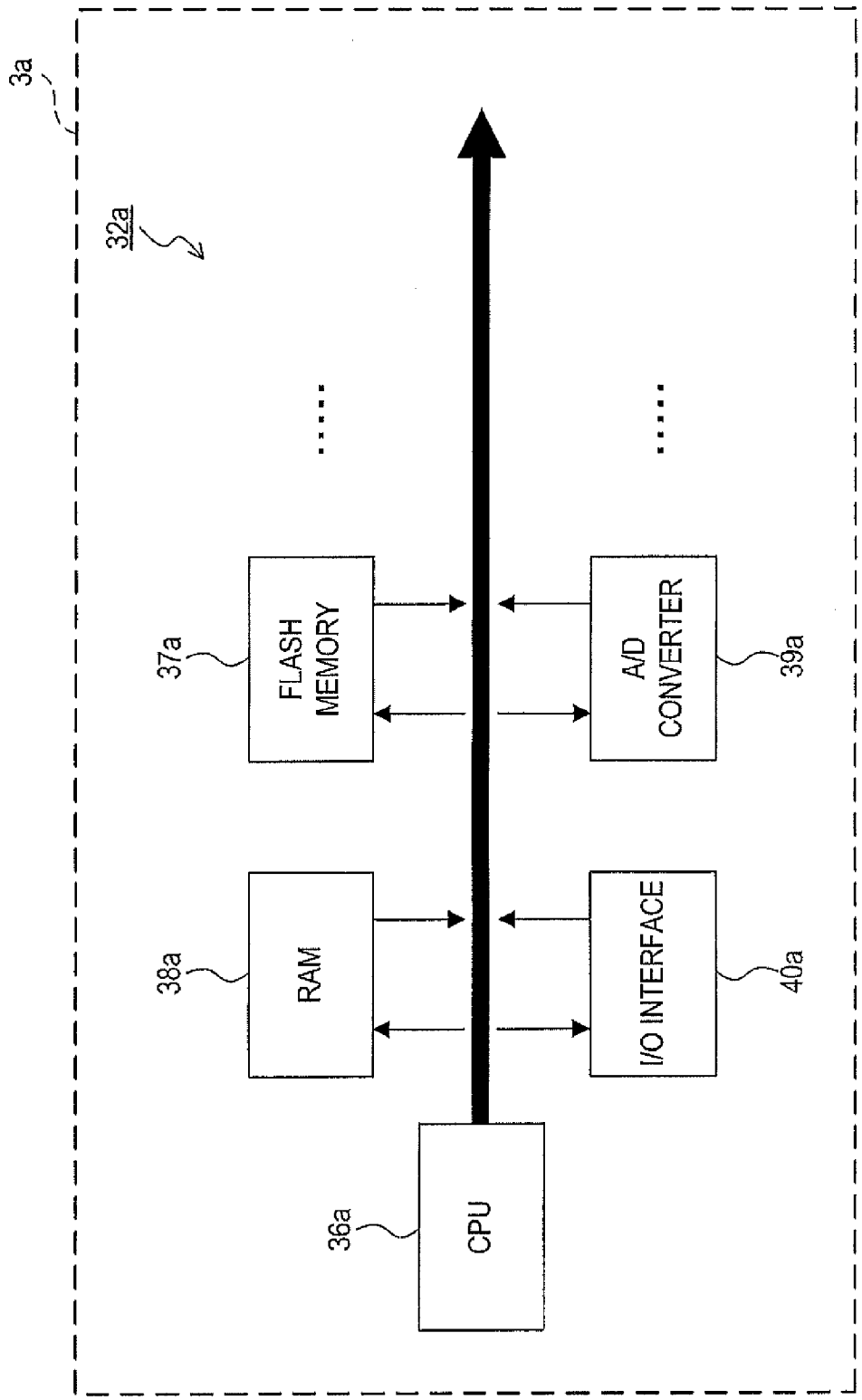
FIG. 7 is a block diagram showing a schematic configuration of a motor controller of a third embodiment.

More specifically, as shown in FIG. 7, the motor controller 32a is provided with a CPU 36a, a flash memory 37a, a RAM 38a, an A/D converter 39a, an I/O interface 40a, and so on, which are connected via a bus. The CPU 36a appropriately performs data communication with various peripherals (peripheral equipment) provided inside the motor controller 32a. The various peripherals are components such as the flash memory 37a, the RAM 38a, the A/D converter 39a, and the I/O interface 40a.

In the data communication between the CPU 36a and the various peripherals, a time required for the data communication may deviate from a predefined time due to, for example, a condition of a data transmission path between the CPU 36a and the peripherals, or fluctuation in data processing time in each of the CPU 36a and the peripherals.

This deviation is a random-number element. In the present embodiment, the CPU 36a uses a random-number element generated in the data communication between the CPU 36a itself and the peripherals, to generate random-number data.

In the present embodiment, a peripheral device, with which the CPU 36a performs data communication for generation of a random number, is the flash memory 37a. The CPU 36a accesses the flash memory 37a at various timings to give instructions on various processes, such as reading, writing, or deleting of stored contents. Upon receipt of various instructions from the CPU 36a, the flash memory 37a executes processes in accordance with the instructions. While the process is being carried out in the flash memory 37a, the CPU 36a appropriately accesses the flash memory 37a to confirm the status of the process, or transmit necessary data. When the instructed process is completed in the flash memory 37a, the access from the CPU 36a to the flash memory 37a is completed.

There is a time period from when the CPU 36a gives the various instructions to the flash memory 37a to when the access from the CPU 36a to the flash memory 37a is completed after the instructed processes have been completed; this time period varies due to the aforementioned various factors, and therefore, has a random-number element. Particularly, among the various processes, in the process of deleting stored contents in the flash memory 37a, an access time of the CPU 36a varies more greatly than those in other processes such as reading, writing, etc. of data, and a degree of randomness is the highest relative to the other processes.

Figure 8:
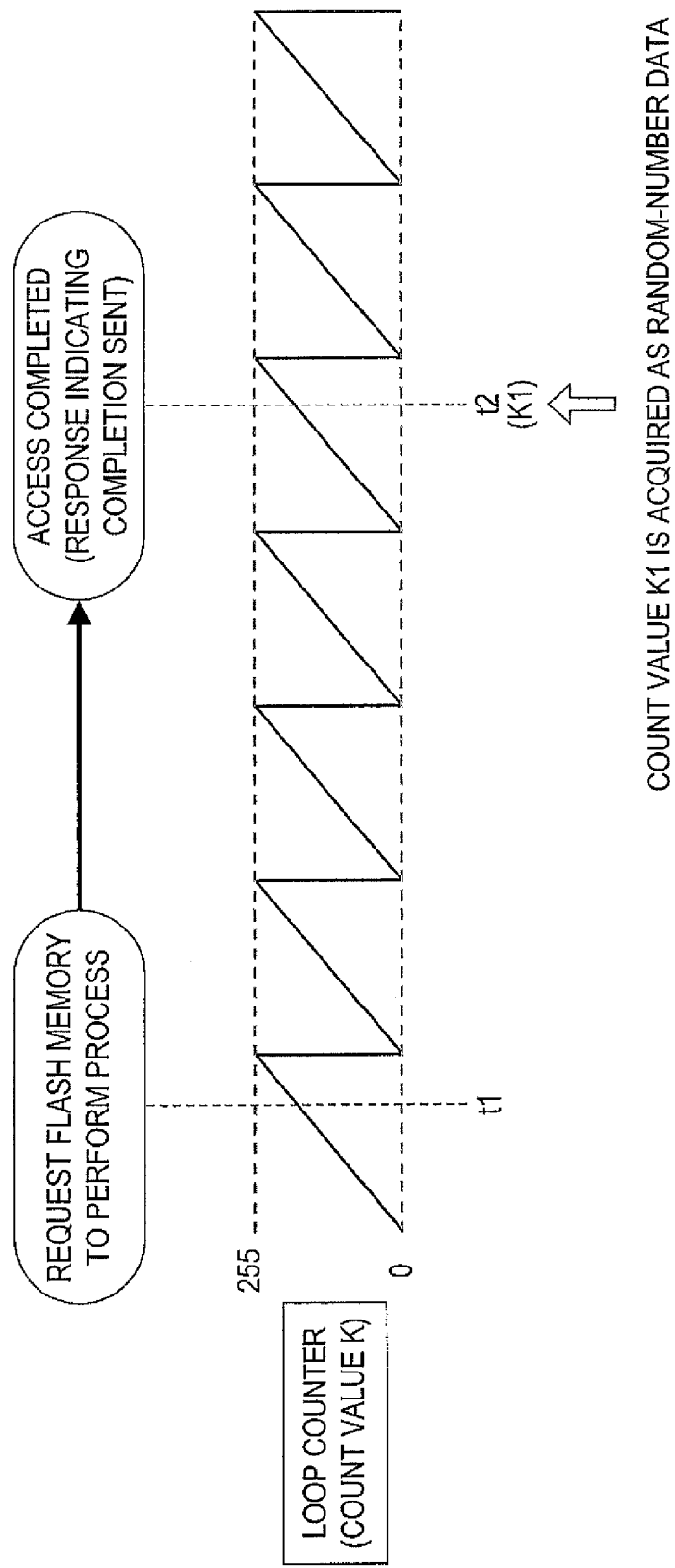
FIG. 8 is an illustrative view for illustrating a random-number generation method of the third embodiment.

Therefore, in the present embodiment, the CPU 36a requests the flash memory 37a to delete predetermined data when generating a random number. Specifically, as illustrated in FIG. 8, the CPU 36a requests the flash memory 37a to perform a process (i.e., deletion of data) at a predetermined timing (time t1) at which generation of a random number is necessary. Here, as in the first embodiment, the CPU 36a operates the loop counter to run constantly.

After requesting the process to the flash memory 37a, the CPU 36a proceeds to delete data while appropriately accessing the flash memory 37a. At time t2, the deletion of data in the flash memory 37a is completed and a response indicating the completion is sent to the CPU 36a, thereby completing the access to the flash memory 37a from the CPU 36a. In this case, a count value K1 of the loop counter at time t2 is acquired as random-number data.

With reference to the flowchart in FIG. 9, a random number generation process executed by the CPU 36a of the motor controller 32a in the present embodiment will be described. As in the first embodiment, the CPU 36a executes the master-side loop counter process in FIG. 3 concurrently with the random number generation process in FIG. 9, so as to continuously perform a counting operation of the loop counter.

Figure 9:
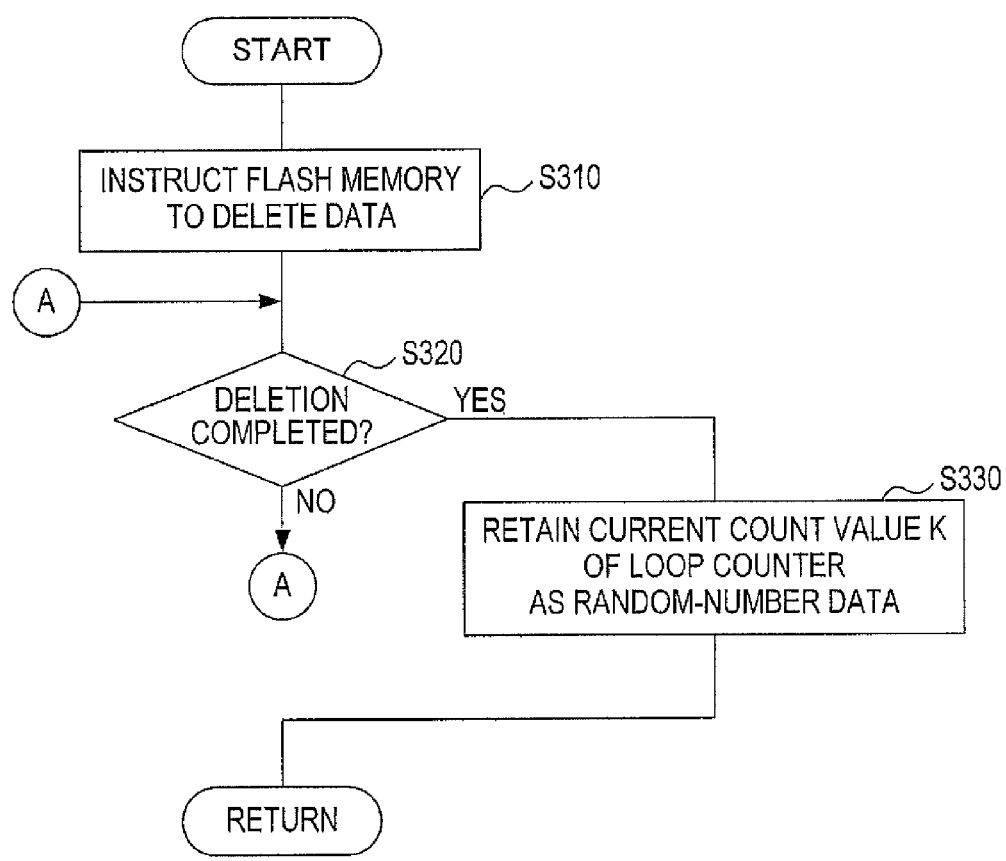
FIG. 9 is a flowchart showing a random number generation process of the third embodiment.

When the random number generation process shown in FIG. 9 is started, in S310, the CPU 36a of the motor controller 32a instructs the flash memory 37a to delete predetermined data. In S320, it is determined whether or not the deletion has been completed. Until the deletion is completed, the determination process in S320 is repeated.

When it is determined that the deletion of data has been completed (access has been completed) based on the response of the completion from the flash memory 37a, in S330, the CPU 36a acquires a current count value K of the loop counter and retains the acquired count value K as random-number data.

If a plurality of pieces of random-number data, each of which has 1 byte, are necessary to generate desired random-number data as in the first embodiment, the CPU 36a may instruct deletion of data to the flash memory 37a at the necessary plural number of times. Alternatively, the count value K may be acquired at the necessary plural number of times during a period from start to completion of access to the flash memory 37a, thereby generating desired random-number data by using the necessary plural number of the count values K.

As described above, in the present embodiment, inside the motor controller 32a of the electric power tool 3a, the CPU 36a utilizes data communication with the peripherals to generate random-number data. Specifically, in the present embodiment, it is configured such that the flash memory 37a is employed as the peripheral for random-number generation, and random-number data is generated by using a random-number element involved in the access time in a case where the deletion of data is instructed to the flash memory 37a. Accordingly, also in the present embodiment, it is possible to generate a random number having high randomness with a simple configuration.

The process, which is requested by the CPU 36a to the flash memory 37a for random-number generation, is not limited to deletion of data, but may be other processes, such as reading, writing, etc. of data. Moreover, the peripheral, which is an object to which the CPU 36a requests a processing for random-number generation, may be peripherals other than the flash memory 37a.

Furthermore, if the CPU 36a requests a processing to the peripheral at a plurality of times, contents in each of the requested processes are not necessarily the same, but may be different from one another. For instance, different processes may be requested, for example, such that the first request is data-deletion request, the second request is data-writing request, the third request is data-reading request, etc.

[Fourth Embodiment]

Next, the fourth embodiment of the present invention will be described. In the present embodiment as well, explanations will be given by using the connection configuration of the battery pack 1 and the electric power tool 3 in the first embodiment shown in FIG. 1.

A random number generating device of the present embodiment is realized as a function of the electric power tool 3. In the first embodiment, as shown in FIG. 2, each time the master receives 1 byte of response data from the slave, the master acquires a count value K of the loop counter. However, in the present embodiment, the master acquires a count value K based on a change in a level of a received voltage ("received-voltage level") of the response data from the slave.

That is, in terms of an electric configuration, the response data from the slave is received as a change between two levels of voltage: High level (hereinafter, referred to as "H level") and Low level (hereinafter, referred to as "L level"). The master monitors a change in a received-voltage level and counts the change from "H level" to "L level" (hereinafter, referred to as "H-to-L edge change") in the received-voltage level. Each time a counted number of H-to-L edge changes becomes an even number, the master acquires a count value K of the loop counter at the time of occurrence of the even number.

Figure 10:
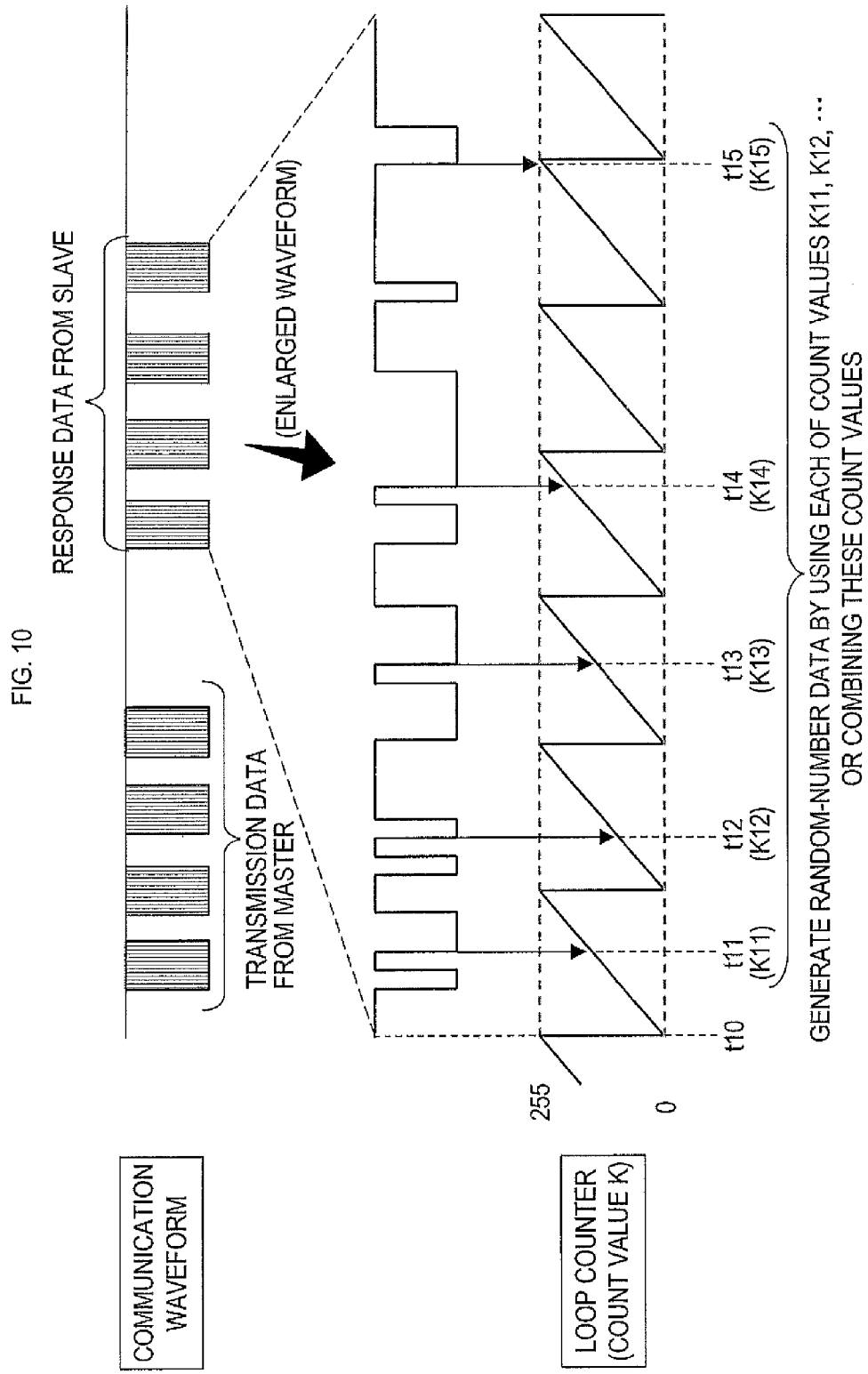
FIG. 10 is an illustrative view for illustrating a random-number generation method of a fourth embodiment.

Specifically, as illustrated in FIG. 10, after receipt of response data is started at time t10, the master detects an H-to-L edge change in the response data and counts a number of the H-to-L edge changes.

When the $2^{nd}$ H-to-L edge change occurs at time t11, the master acquires and retains a count value K11 of the loop counter at that time t11. Thereafter, when the $4^{th}$ H-to-L edge change occurs at time t12, the master acquires and retains a count value K12 of the loop counter at that time t12.

Likewise, the master acquires and retains a count value K13 of the loop counter at time t13 at which the $6^{th}$ H-to-L edge change occurs; the master acquires and retains a count value K14 of the loop counter at time t14 at which the $8^{th}$ H-to-L edge change occurs; and the master acquires and retains a count value K15 of the loop counter at time t15 at which the $10^{th}$ H-to-L edge change occurs.

The master uses these five acquired count values K11 to K15 to generate one set of random-number data in the same manner as in the first embodiment. That is, one set or a plurality of sets of random-number data may be generated by combining each of the count values K11 to K15. Alternatively, each of the count values K11 to K15 may be independently used as random-number data.

The master-side random number generation process executed by the CPU 36 of the motor controller 32 in the present embodiment will be described with reference to a flowchart in FIG. 11.

Figure 11:
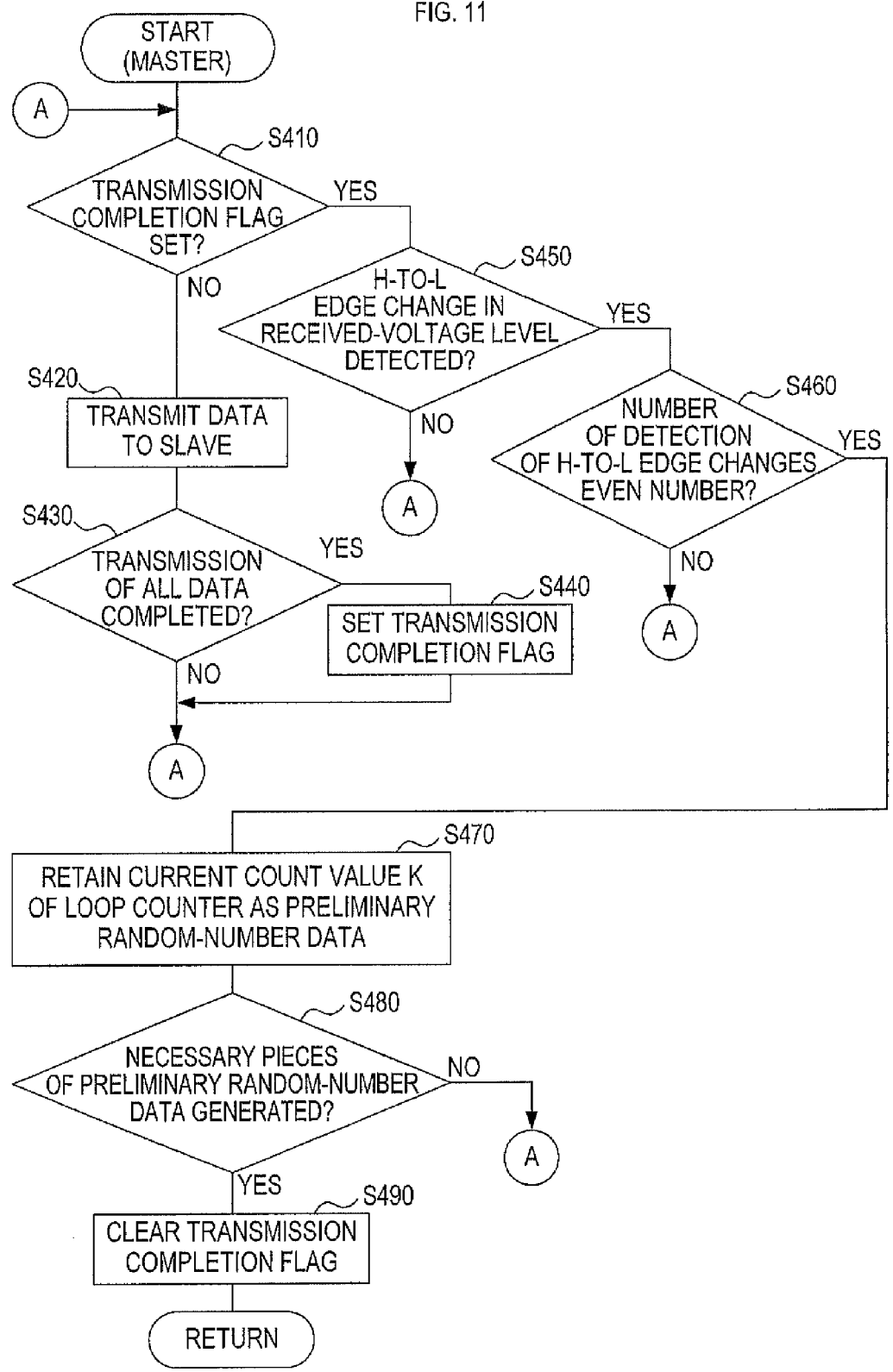
FIG. 11 is a flowchart showing a master-side random number generation process of the fourth embodiment.

When the master-side random number generation process shown in FIG. 11 is stated, the CPU 36 of the motor controller 32 determines in S410 whether or not a transmission completion flag has been set. If the transmission completion flag has been set, the process proceeds to S450. If the transmission completion flag has not been set, the process proceeds to S420 and transmits predetermined data for random-number generation to the slave. The processes in S420 to S440 are the same as those in S120 to S140 in FIG. 4 in the first embodiment. When the transmission of the data to the slave is completed, the transmission completion flag is set (S440).

When the process proceeds to S450 since it was determined in S410 that the transmission completion flag has been set, the CPU 36 determines whether or not an H-to-L edge change in a received-voltage level of the response data has been detected. If an H-to-L edge change is not detected, the process returns to S410. However, if the H-to-L edge change is detected, the process proceeds to S460.

In S460, the CPU 36 determines whether or not a number of detection of the H-to-L edge changes from the start of receiving the response data is an even number. If the number of detection is not an even number, the process returns to S410. If the number of detection is an even number, the process proceeds to S470. In S470, the CPU 36 acquires a current count value K of the loop counter and retains the acquired count value K as preliminary random-number data. In S480, the CPU 36 determines whether or not necessary pieces of preliminary random-number data have been generated in the same manner as in S170 in FIG. 4. If the necessary pieces of preliminary random-number data have not yet been generated, the process returns to S410. If it is determined in S480 that the necessary pieces of preliminary random-number data have been generated, in S490, the transmission completion flag is cleared; then, the current master-side random number generation process is terminated.

As described above, in the present embodiment, each time an H-to-L edge change in the response data from the slave occurs at an even number of times, the master acquires a count value K at the time of the occurrence of the even number, to generate random-number data. Therefore, if the response data is configured to be, not predetermined data, but data that changes depending on a condition, etc. in the slave at the time of a response, a random-number element is generated in the response data itself. That is, in addition to a random-number element of a response period from when the master transmits data to the slave to when the master receives response data, there is generated a random-number element due to variation (uncertainty) in the response data itself.

Thus, the master in the present embodiment can generate a random number that has randomness higher than those generated in the first and second embodiments.

Response data including a random-number element, for example, may be data indicating a voltage of the battery 10 or a cell voltage of each of the battery cells 26 to 29, etc. Moreover, it is merely one example to acquire a count value K each time an H-to-L edge change of the response data occurs at an even number of times as described above. The acquisition may be performed each time an H-to-L edge change occurs at an odd number of times or at a predetermined number of times.

Furthermore, a count value K may be acquired, not based on a number of times of occurrence of H-to-L edge changes, but based on a number of times of detection that detects a timing of a change of the response data changing from L level to H level. As long as an acquisition timing of a count value K can be appropriately set depending on a change in a voltage level of the response data, a specific way of setting the acquisition timing can be considered in various ways.

[Other Embodiment]

(1) In the first and second embodiments, the master transmits specific data for random-number generation to the slave and then, the slave responds thereto, thereby generating random-number data. However, date transmitted from the master is not necessarily the specific data for random-number generation. As long as transmission data is configured to cause the slave to send a response in response to such transmission data from the master, various transmission data can be transmitted to generate random-number data.

Moreover, contents and format, etc. of the response data, which the slave transmits in response to the transmission data from the master, are not limited to those in the above-described embodiments. As long as the master can acquire a necessary number of count values K at an appropriate timing based on the response data from the slave, the slave may transmit response data having various contents and in various formats.

(2) It may be appropriately determined at what timing during receipt of the response data from the slave the master acquires a count value K of the loop counter. For instance, other than the timings in the above-described embodiments, the master may acquire a count value K at a timing when receipt of the response data is started or at a predetermined timing after the receipt of the response data is completed (e.g., after a predetermined period of time from completion of the receipt of the response data elapses).

When a plurality of count values K are necessary, it can be also appropriately determined at what timing and at what time interval each of the plurality of count values K is acquired. For example, in the first embodiment, it is configured such that, in one entire set of response data sent in response to one set of transmission data, acquiring a necessary number of count values K is performed at a plurality of times (e.g., at each time 1 byte of the response data is received, in the above embodiment).

However, it is not necessary required to acquire all of the necessary number of count values K during receipt of the one set of response data. It may be configured such that transmission data is transmitted at a plurality of times and then response data in response to such transmission data is received at the respective plurality of times, thereby acquiring the necessary number of count values K as a whole. For example, the following configuration may be possible: from one piece of response data, only one count value K is acquired; if a certain plurality of count values K are necessary, transmission data is transmitted at the certain plurality of times; and each time the response data is sent in response to the transmission data, a count value K is acquired.

The acquisition timing of a count value K in each of the above embodiments is merely one example. As long as it is possible to determine an acquisition timing based on the response data from the slave and acquire the count value K based on such an acquisition timing, the count value K may be acquired at any acquisition timing. It may be appropriately determined how many pieces of response data are to be used to generate one random number.

(3) As a method of generating a random number having a number of bits larger than a number of bits (1 byte in the above embodiment) of the loop counter, the above-described embodiment illustrates a method in which a necessary number of count values K of the loop counter of 1 byte is acquired and these count values K are combined to generate one random number; however, this method is merely one example. For example, it may be possible to use a counter capable of counting a number of bits that is equal to or larger than a number of bits of a random number to be generated.

Moreover, the following may be appropriately determined: in order to generate a random number with a certain number of bits, what counter with how many bits is used, how many count values K are used, and in a case where one random number is generated based on a plurality of count values K, how the plurality of count values K are combined.

(4) Although in the above embodiments, the loop counter is constituted as a software timer by the CPU, this constitution is merely one example. For example, the loop counter may be constituted as a hardware timer. A specific configuration of the loop counter should not be particularly limited.

(5) The response data itself sent from the slave is not necessarily digital data and may be an analog signal. If the response data sent from the slave is an analog signal, for example, the analog signal may be A/D converted inside a microcomputer provided in the master, and the response data after the A/D conversion may be processed by the master.

(6) An operation-start timing of the loop counter is not necessarily a timing at which the CPU starts operation, and may be, for example, the following timings: a predetermined timing during a period from when the CPU starts the operation to when the CPU starts data transmission; a predetermined timing during the data transmission; and a timing after a predetermined time elapses after completion of the data transmission. However, in order to generate a random number having a higher degree of randomness, the operation-start timing of the loop counter may be preferably earlier than a timing at which receipt of the response data from the slave is started; more preferably, the operation-start timing of the loop counter may be before start of the data transmission.

Moreover, it is not essential to constantly operate the loop counter. The loop counter may be switched between an operation state and a non-operation state, as needed; for example, the loop counter may start a counting operation when it is necessary (i.e., when generation of a random number is necessary), and after a necessary number of random numbers is generated, the operation of the loop counter may be stopped.

(7) Although the above embodiment illustrates an example in which the battery pack 1 is attached to the electric power tool 3 (see FIG. 1) and an example in which the battery pack 1 is attached to the adapter 5 (see FIG. 6), such combinations of these devices are merely one example.

Figure 12:
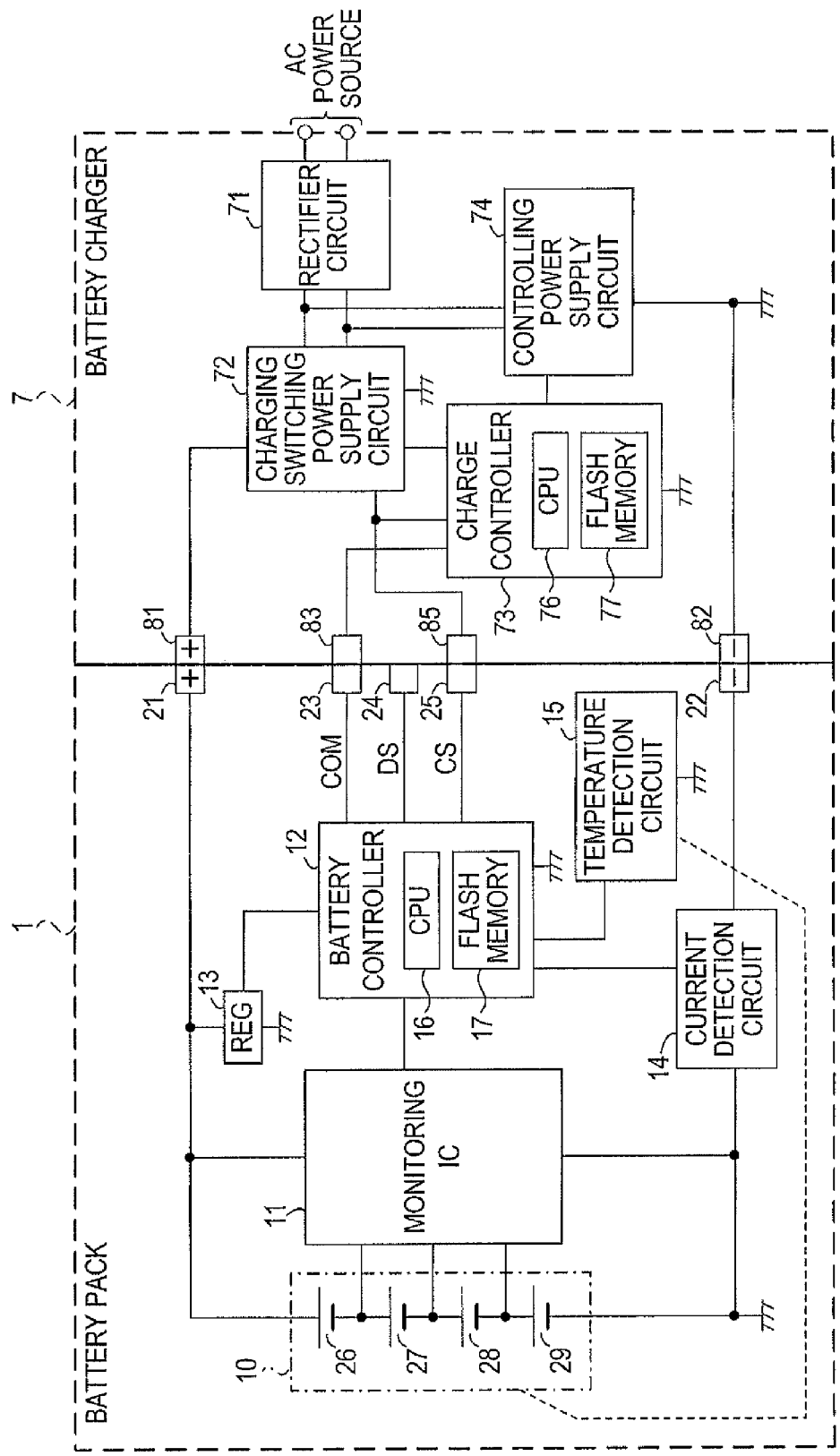
FIG. 12 is an illustrative view showing a schematic configuration of a battery pack and a battery charger of another embodiment.

For example, as shown in FIG. 12, the present invention can be applied to an example in which the battery pack 1 is attached to the battery charger 7. The battery pack 1 in FIG. 12 is the same as that in FIG. 1. The battery charger 7 is a device to charge the battery 10 of the battery pack 1.

The battery charger 7 shown in FIG. 12 is provided with a rectifier circuit 71, a charging switching power supply circuit 72, the charge controller 73, a controlling power supply circuit 74, a positive electrode terminal 81, a negative electrode terminal 82, a common communication terminal 83, and a charge-control communication terminal 85.

The rectifier circuit 71 rectifies an alternate voltage supplied from an alternating current (AC) power source such as a commercial power source. Such a rectified output is outputted to the charging switching power supply circuit 72 and the controlling power supply circuit 74.

The charging switching power supply circuit 72 is a switching power supply circuit that generates a direct-current charging power to be charged to the battery 10 based on an output from the rectifier circuit 71. The charging switching power supply circuit 72 is drive-controlled by the charge controller 73.

The controlling power supply circuit 74 is a switching power supply circuit that generates a predetermined control voltage based on an output from the rectifier circuit 71. The control voltage generated by the controlling power supply circuit 74 is used as a power source for operating the charge controller 73.

The charge controller 73 is constituted of a microcomputer provided with a CPU 76, a flash memory 77, and others, as in the battery controller 12 in the battery pack 1.

After charge control is started, when the charge controller 73 receives a charge completion signal from the battery controller 12 in the battery pack 1 via the charge-control communication terminal 85, the charge controller 73 suspends the charge control. The charge controller 73 is configured to be capable of performing data communication with the battery controller 12 in the battery pack 1 via the common communication terminal 83.

By having the aforementioned configurations as a basis, the charge controller 73 further includes a battery-pack authentication function that authenticates whether or not the battery pack 1 is a proper battery pack. If the battery pack 1 is determined to be a proper one by the battery-pack authentication function, the charge controller 73 performs charge control of the battery 10.

The battery-pack authentication function by the charge controller 73 is the same as the battery-pack authentication function by the electric power tool 3 in the first embodiment. That is, the CPU 76 of the charge controller 73 acts as a master and the CPU 16 of the battery controller 12 acts as a slave; data communication between the master and the slave is performed in the same manner as in the first embodiment, thereby generating random-number data. The generated random-number data is used to authenticate the battery pack.

As described above, in the combination of the battery charger 7 and the battery pack 1, the battery charger 7 acts as the master and the battery pack 1 acts as the slave, and generation of a random number can be performed in the master as in the first embodiment. The present invention can be applied to combinations other than the aforementioned combinations of the various devices.

(8) Described in each of the above embodiments is a configuration in which the function of the master is realized by software processing performed by the CPU. However, it is not absolutely necessary to realize the function of the master by software processing. Part or all of the function of the master may be realized by hardware.

(9) As an example of generating a random number by data communication within a single device, the second embodiment illustrates the data communication between the battery controller 12*a* and the monitoring IC 11*a* inside the battery pack 1*a*. However, this example is merely one example. It is possible to generate a random number in a device other than the battery pack 1*a*, by using data communication within the device.

(10) As the random-number generation rule for generating one random number by combining a plurality of count values K, various rules can be considered other than those described in the above-described embodiments. For example, contrary to the first embodiment, the acquired count value K may be aligned to a side of an MSB. Moreover, for example, generation of one random number may be performed by predetermined calculation using a plurality of count values K.

The present invention should not be limited to specific devices and constitutions, etc., described in the above embodiments, but may be implemented in various forms without departing from the scope of the present invention. A form in which part of the configurations in the above-described embodiments is omitted to the extent that the problems can be solved is included as an embodiment of the present invention. Moreover, a form configured by appropriately combining a plurality of the above-described embodiments is included as an embodiment of the present invention.

What is claimed is:

1. A random number generating device comprising:
a processor configured to act as:
a processing request part configured to make a request for a predetermined processing to a processing requested object;
a receiving part configured to receive a response from the processing requested object in response to the request;
a counting part configured to perform a counting operation to increase or decrease a count value with a predetermined cycle, the counting operation being started at least prior to receipt of the response; and
a random number generation part configured to acquire at least one count value of the counting part at least one predetermined acquisition timing after the receipt of the response is started, and to generate a random number by using the at least one count value that is acquired.

2. The random number generating device according to claim 1,
wherein one of the at least one predetermined acquisition timing is a timing at which the receipt of the response is completed.

3. The random number generating device according to claim 1,
wherein the at least one acquisition timing is a plurality of acquisition timings, and
wherein the random number generation part is configured to acquire the count value of the counting part at each of the plurality of acquisition timings, and to generate a random number by using a plurality of count values acquired, respectively, at the plurality of acquisition timings.

4. The random number generating device according to claim 3,
wherein the random number generation part is configured to generate one random number in accordance with a predetermined random-number generation rule that uses at least two or more of the plurality of count values.

5. The random number generating device according to claim 3,
wherein each of the plurality of acquisition timings is set during a reception period from when the receipt of the response is started to when the receipt of the response is completed.

6. The random number generating device according to claim 3,
wherein the processing request part is configured to perform the request for processing by transmitting predetermined transmission data,
wherein the receiving part is configured to receive reception data having a predetermined number of bits, the reception data being the response from the processing requested object in response to the transmission data, and
wherein the at least one acquisition timing is a predetermined timing predetermined for each of the at least one acquisition timing, the predetermined timing selected from reception timings at each of which data in each bit of the predetermined number of bits constituting the reception data is received after the receipt of the reception data is started.

7. The random number generating device according to claim 1,
wherein the random number generating device is installed in an electrical device provided with a predetermined function, and
wherein the processing requested object is provided in a connected device that is used by being connected to the electrical device.

8. The random number generating device according to claim 1,
wherein the random number generating device is installed in an electrical device provided with a predetermined function, and
wherein the processing requested object is provided inside the electrical device.

9. The random number generating device according to claim 1, further comprising a microcomputer including a CPU functioning as the processor,
wherein each of the processing request part, the receiving part, the counting part, and the random number generation part, which are provided in the random number generating device, is realized by a predetermined program executed by the CPU.

10. The random number generating device according to claim 1, further comprising a microcomputer including a CPU functioning as the processor,
wherein each of the processing request part, the receiving part, the counting part, and the random number generation part, which are provided in the random number generating device, is realized by a predetermined program executed by the CPU, and
wherein the processing requested object is a peripheral that communicates with the CPU inside the microcomputer.

11. The random number generating device according to claim 10,
wherein the peripheral is a memory in which a stored content is rewritable,
wherein the processing request part is configured to make a request for a predetermined processing with respect to the stored content of the memory, and
wherein one of the at least one acquisition timing is set based on a receiving timing at which a signal is received, the signal being outputted as the response from the memory when the predetermined processing requested is completed in the memory.

* * * * *